United States Patent
Polido et al.

(10) Patent No.: US 12,528,653 B1
(45) Date of Patent: Jan. 20, 2026

(54) CONCENTRIC SUCTION CUP TOOLS WITH INTEGRATED AIR CHAMBERS

(71) Applicant: Amazon Technologies, Inc., Seattle, WA (US)

(72) Inventors: Felipe De Arruda Camargo Polido, North Reading, MA (US); Vincent Kerstholt, Luxembourgh (LU); Aaron Size, Waltham, MA (US)

(73) Assignee: Amazon Technologies, Inc., Seattle, WA (US)

( * ) Notice: Subject to any disclaimer, the term of this patent is extended or adjusted under 35 U.S.C. 154(b) by 975 days.

(21) Appl. No.: 17/700,766

(22) Filed: Mar. 22, 2022

(51) Int. Cl.
*B25J 15/06* (2006.01)
*B25J 15/00* (2006.01)
*B65G 47/91* (2006.01)

(52) U.S. Cl.
CPC .......... *B65G 47/91* (2013.01); *B25J 15/0616* (2013.01); *B65G 47/917* (2013.01); *B65G 47/918* (2013.01); *B25J 15/0052* (2013.01); *B25J 15/0683* (2013.01)

(58) Field of Classification Search
CPC ................ B25J 15/0683; B25J 15/0616; B25J 15/0052; B25J 15/0061; B25J 15/0625; B65G 47/91; B65G 47/918; B65G 47/917
USPC ...................................................... 294/186
See application file for complete search history.

(56) References Cited

U.S. PATENT DOCUMENTS

| | | | | |
|---|---|---|---|---|
| 10,611,037 B1* | 4/2020 | Polido | ................. | B25J 15/0061 |
| 10,611,580 B1* | 4/2020 | Polido | ................. | B65G 47/912 |
| 10,821,611 B1* | 11/2020 | DeFant | ................ | B25J 15/0625 |
| 10,913,165 B1* | 2/2021 | Jonas | ................... | B25J 19/0041 |
| 10,933,537 B1* | 3/2021 | Polido | ................... | B25J 13/081 |
| 11,492,215 B1* | 11/2022 | Polido | ................. | B25J 15/0658 |
| 11,865,727 B1* | 1/2024 | Parness | ................. | B25J 9/1687 |
| 2024/0367330 A1* | 11/2024 | Churchill | ............ | B25J 17/0225 |

* cited by examiner

*Primary Examiner* — Mahdi H Nejad
(74) *Attorney, Agent, or Firm* — Eversheds Sutherland (US) LLP

(57) ABSTRACT

Systems and methods are disclosed for concentric suction cup tools with integrated air chambers. In one embodiment, an example picking assembly may include a vacuum manifold having a first integrated air pressure path and a second integrated air pressure path, and a first piston subassembly that includes a first air pipe, a first vacuum pipe, a first bushing disposed between the first air pipe and the first vacuum pipe, and a first suction cup, where the first piston subassembly is configured to independently actuate from a retracted position to an extended position. The picking assembly may include a second piston subassembly having a second air pipe, a second vacuum pipe, a second bushing disposed between the second air pipe and the second vacuum pipe, and a second suction cup, where the second piston subassembly is configured to independently actuate from the retracted position to the extended position.

17 Claims, 16 Drawing Sheets

CONCENTRIC SUCTION CUP TOOLS WITH INTEGRATED AIR CHAMBERS

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. Accordingly, improvements in various operations of order fulfillment, such as improvements to picking technology, sorting technology, packing technology, and so forth may be desired, such that manual efforts can be redirected to different tasks.

Figure 1:
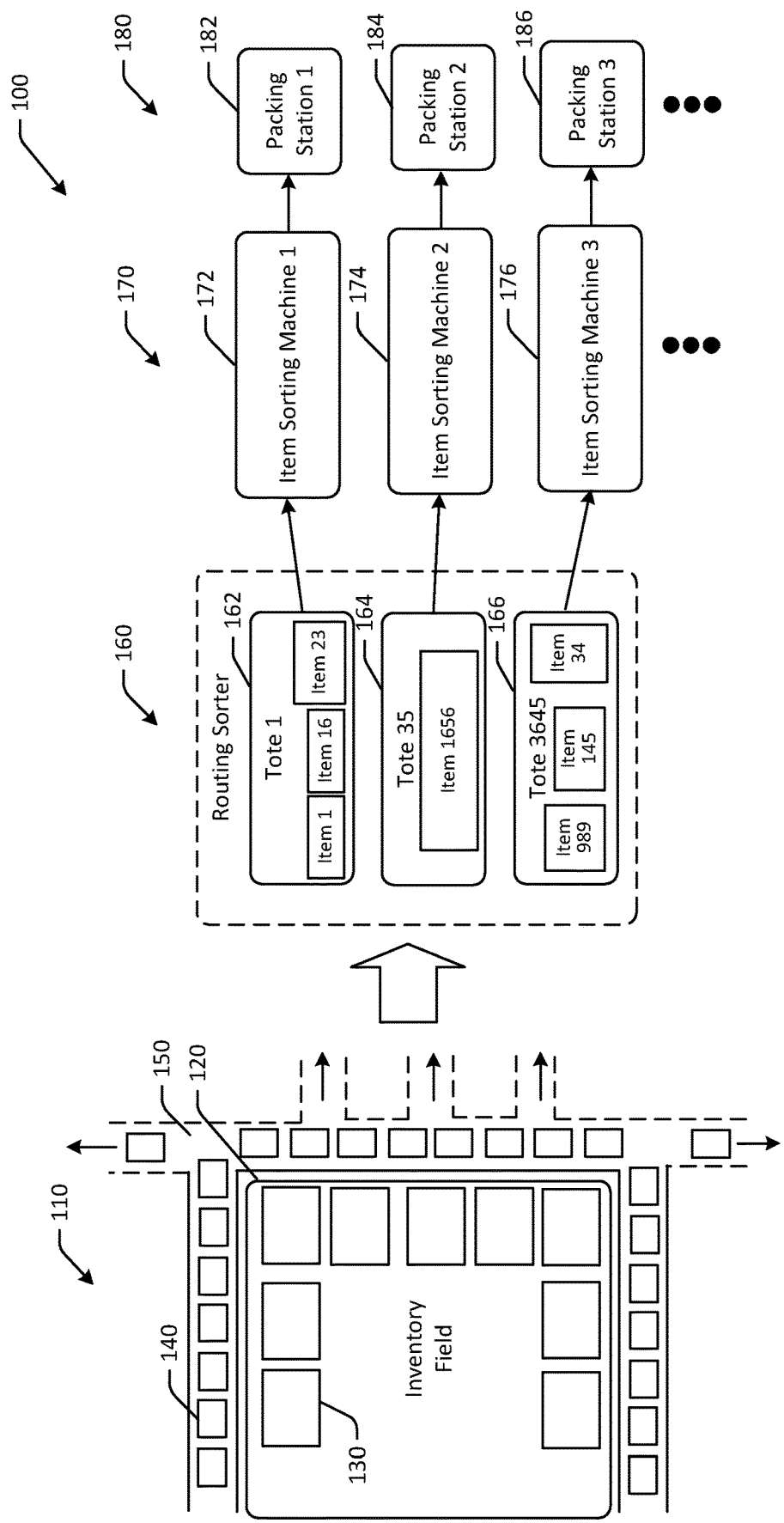
FIG. 1 is a hybrid schematic illustration of an example use case for concentric suction cup tools with integrated air chambers and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

Moving items or objects through a fulfillment center may require handling of the item itself. For example, picking the item from inventory, placing the item into a container, removing the item from a container, handling containers, and so forth may all be examples of actions for which an item may need to be handled. In addition, different items may have different types of packaging. For example, some items may come in boxes, some items may come in loose bags, some items may come shrink wrapped, some items may not have any packaging, and so forth. In addition, retrieving a certain number of items, such as singular items, may be difficult depending on a type of packaging in which the item comes with. Humans may be able to manually handle individual items with ease. However, robotic handling of individual items may require various levels of dexterity. In addition, using a robot or other machine to grasp an item in a cluttered environment, such as a box or tote with multiple items inside, may be difficult to achieve reliably using mechanical systems.

Embodiments of the disclosure include methods and systems for automated handling of items and objects regardless of packaging that may improve processing and fulfillment of orders, or other object aggregation tasks. Certain embodiments include concentric suction cup picking assemblies or end of arm tools that can be used with various robotic manipulators, such as robotic arms, gantries, rails, etc. to grasp items of various shapes and sizes with improved grasp strength or security, while at the same time reducing manufacturing complexity. Some embodiments include concentric suction cup picking assemblies having integrated air chambers, where vacuum and air pressure lines can be arranged in a concentric arrangement to reduce overall footprint. Some embodiments include picking assemblies having integrated brake assemblies, where the brake assembly can be used to secure individual suction cup pistons in a certain position, thereby reducing a likelihood that a suction cup piston shifts from a desired position after contact with an item. Some embodiments include both integrated air chambers and integrated brake assemblies. In some embodiments, a single vacuum manifold may be used to supply vacuum pressure, and in some instances positive air pressure, to one or more piston subassemblies. Vacuum pressure may be used to cause suction cup assemblies to retract, and positive air pressure may be used to cause suction cup assemblies to extend. Embodiments may include robotic arms with picking assemblies that use concentric suction cup tools with integrated air chambers and/or integrated brake assemblies in conjunction with vacuum suction to pick up and/or release, or otherwise handle, objects, so as to increase throughput and speed of object handling. Some embodiments include optimized process flows for processing of orders at fulfillment centers, as well as process flows or methods to increase speed of consolidating products in a multi-item order as a result of improved speed in placing items into containers and removing items from containers. As a result, throughput of fulfillment centers may be improved, and/or logistics of fulfillment center operations may be less complicated.

Referring to FIG. 1, an example use case 100 for concentric suction cup tools with integrated air chambers and/or integrated brake assemblies and an example process flow are depicted in accordance with one or more embodiments of the disclosure. Although discussed in the context of online orders, other embodiments may be directed to any suitable use case where objects are picked and released, such as instances where objects are picked from inventory, placed into containers, removed from containers for sorting, and so forth.

In FIG. 1, a fulfillment center may include an inventory field 110, a routing sorter 160, one or more item sorting machines 170, and one or more packing stations 180. The inventory field 110 may be include a storage platform, or a portion of the fulfillment center at which products picked from product inventory are placed. Robots may be used to pick products from inventory and to deliver to the robotic storage platform in some instances, while in other instances, manual effort or a combination thereof may be used to pick products. For example, concentric suction cup tools with integrated air chambers and/or integrated brake assemblies may be used to pick objects from inventory containers and to place the retrieved objects into containers. The picking process at the robotic storage platform may include locating a product in an order, obtaining the product, and sending the product to a robotic storage platform, such as via a conveyor belt. In the illustrated embodiment, products at the robotic storage platform may be placed in a container, such as a tote.

The inventory field 110 may include multiple items that are in inventory. The items may be used to fulfill orders. The inventory field 110 may be a robotic field in some instances. One or more picking stations 130 may be positioned along a perimeter 120 of the inventory field 110. The picking stations 130 may be manually operated or may include robotic components, or a combination thereof. In some instances, picking of items from the inventory field 110 may be completed by robots that include concentric suction cup tools with integrated air chambers and/or integrated brake assemblies, where the items are delivered to the picking stations 130 after being retrieved from the inventory field 110. Any number of picking stations 130 may be included, and the picking stations 130 may be located in a different position than that illustrated in FIG. 1.

One or more conveyors 150 may be disposed about the inventory field 110. For example, conveyors 150 may be disposed along the perimeter 120 of the inventory field 110. The conveyors 150 may run adjacent to the picking stations 130 in some embodiments. Any suitable conveyor configuration may be used. In the illustrated example, the conveyors 150 may include belts or rollers that run alongside the picking stations 130 and include one or more paths to one or more routing sorters.

The conveyors 150 may be used to transport one or more totes 140. For example, as totes 140 move along the conveyors 150, items may be moved from the picking stations 130 into respective totes 140. The totes 140 may be associated with particular item sorting machines, and may be moved using the conveyors 150 to a routing sorter 160.

The routing sorter 160 may be configured to route, divert, or otherwise guide certain totes to an item sorting machine. The routing sorter 160 may include any combination of ramps, slides, rollers, arms, guides, and/or other components to route totes to a particular item sorting machine. At the routing sorter 160, totes including products that have been picked may be routed to the appropriate or designated item sorting machine. For example, the routing sorter 160 may determine an identifier associated with the tote, and may determine an item sorting machine associated with the tote using the identifier. The routing sorter 160 may route or direct the tote to the appropriate item sorting machine.

A number of item sorting machines 170 may be coupled to the routing sorter 160. For example, a first item sorting machine 172, a second item sorting machine 174, a third item sorting machine 176, and so forth may be coupled to the routing sorter 160. The routing sorter 160 may guide totes to the item sorting machines to which they are assigned. For example, a first tote 162 may include item 1, item 16, and item 23, and may be assigned to the first item sorting machine 172. The routing sorter 160 may therefore route the first tote 162 to the first item sorting machine 172 for sortation of the respective items. A second tote 164 may include item 1656, and may be assigned to the second item sorting machine 174. The routing sorter 160 may therefore route the second tote 164 to the second item sorting machine 174 for sortation of the item. A third tote 166 may include item 989, item 145, and item 34, and may be assigned to the third item sorting machine 176. The routing sorter 160 may therefore route the third tote 166 to the third item sorting machine 176 for sortation of the respective items.

Some or all of the item sorting machines may be associated with one or more packing stations 180 that may be used to pack items into a shipment when a multi-item order is complete. For example, the first item sorting machine 172 may be coupled to a first packing station 182, the second item sorting machine 174 may be coupled to a second packing station 184, the third item sorting machine 176 may be coupled to a third packing station 186, and so forth. The item sorting machines may be configured to receive items from totes that have one or more, or multiple, items. The number of totes and/or the number of items associated with respective item sorting machines may be balanced, and multiple totes may be routed to the first item sorting machine 172 and the second item sorting machine 174 at the same time.

At any of the stages of the example fulfillment process of FIG. 1 where handling of objects is used, such as to pick items from inventory, place items in totes, remove items from totes, place items into bins, remove items from bins, place items into boxes for shipping, and so forth, concentric suction cup tools with integrated air chambers and/or integrated brake assemblies as described herein may be used. As a result, manual effort can be redirected to other tasks.

Embodiments of the disclosure include concentric suction cup tools with integrated air chambers and/or integrated brake assemblies. Certain embodiments may improve processing speed and/or throughput of fulfillment centers. Certain embodiments may improve performance of mechanical equipment for sortation and/or consolidation of items. While described in the context of online orders, aspects of this disclosure are more broadly applicable to other forms of object handling.

Unlike other suction-based grippers, the concentric suction cup tools with integrated air chambers and/or integrated brake assemblies described herein may accurately grasp targeted items in cluttered environments, regardless of an amount of an item available for grasping, and may provide repeatable performance over an increased lifetime resulting from robust design and incorporation of a load bearing shell. In some embodiments, compliant suction elements may be used in a parallel architecture that increases a compliant to tool length ratio, increases the extending element stiffness, and increases tool life time (e.g., such as about 4.5 million cycles). In addition, embodiments may include a universal adapter plate for a quick mechanical connection between different tools and/or vacuum sources.

Embodiments of the disclosure may therefore provide a robust object handling system that improves functionality and flexibility with respect to the types of objects that can be handled using robotic or other mechanical equipment. Some embodiments may include a concentric design, where multiple concentric parallel piston subassemblies are arranged to handle a wider range of item sizes, and other embodiments may include a concentric array design, which may be configured to handle a wide range of item shapes and sizes.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2A:
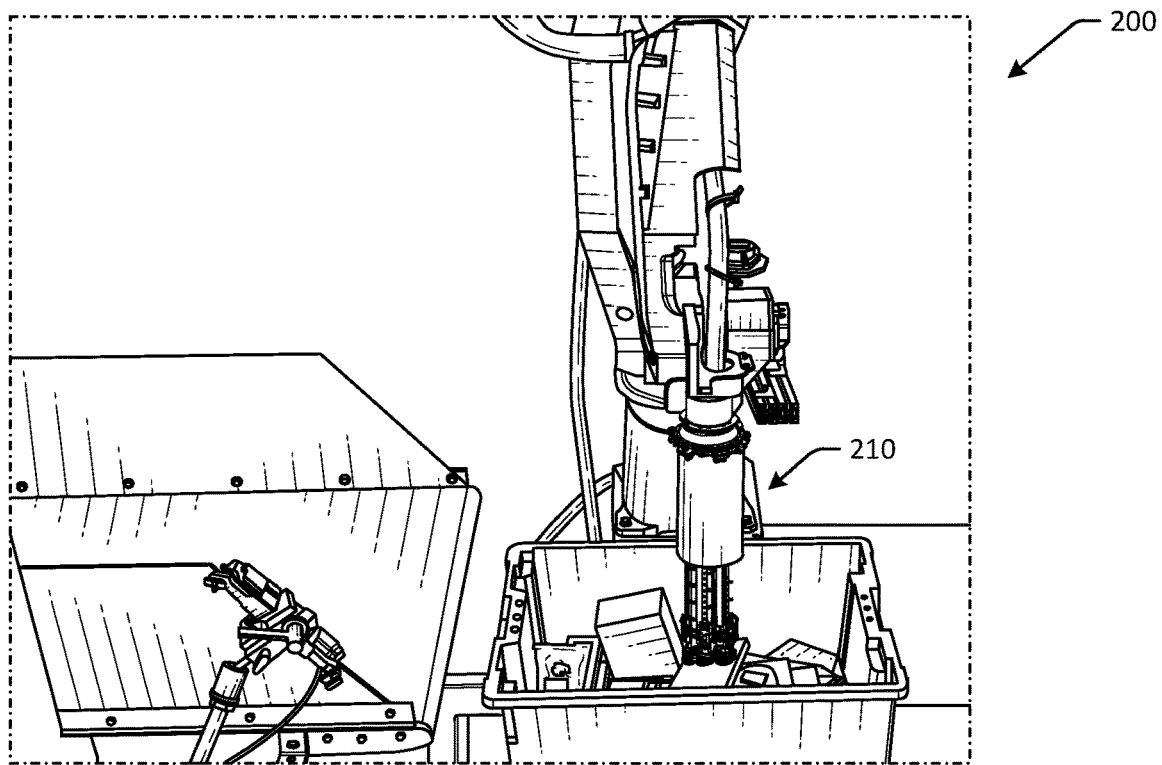
FIGS. 2A-2B are schematic illustrations of example use cases for concentric suction cup tools with integrated air chambers in accordance with one or more embodiments of the disclosure.
Figure 2A:
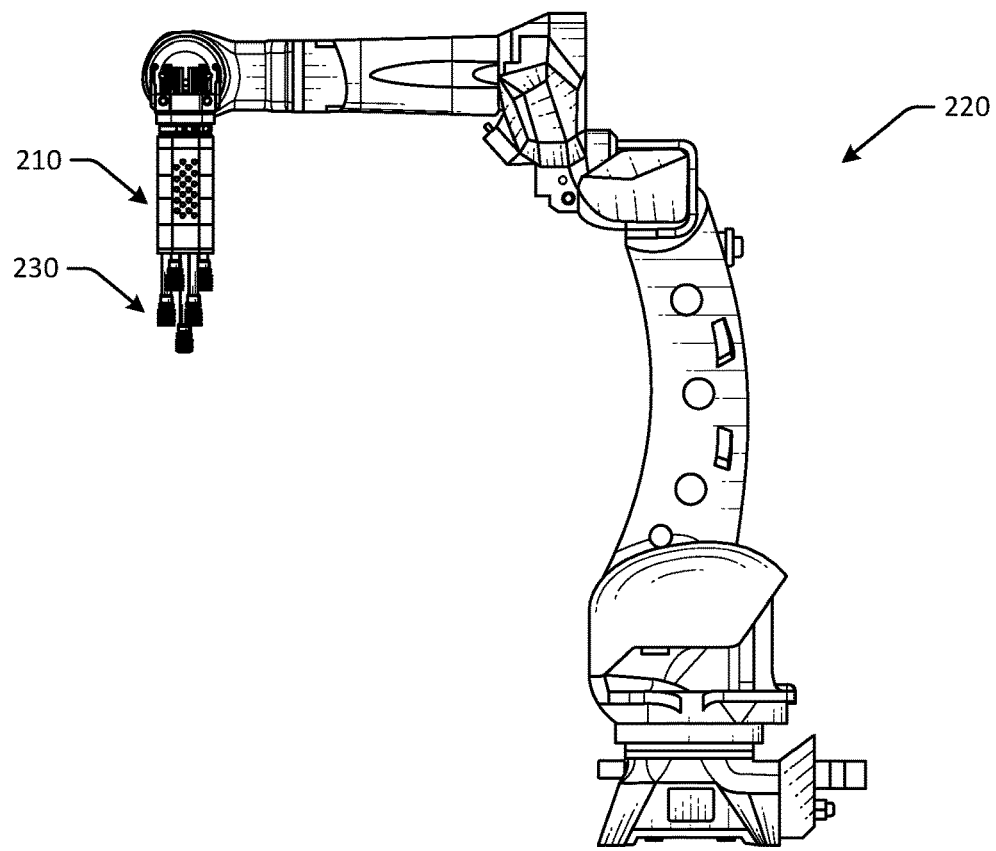
Figure 2B:
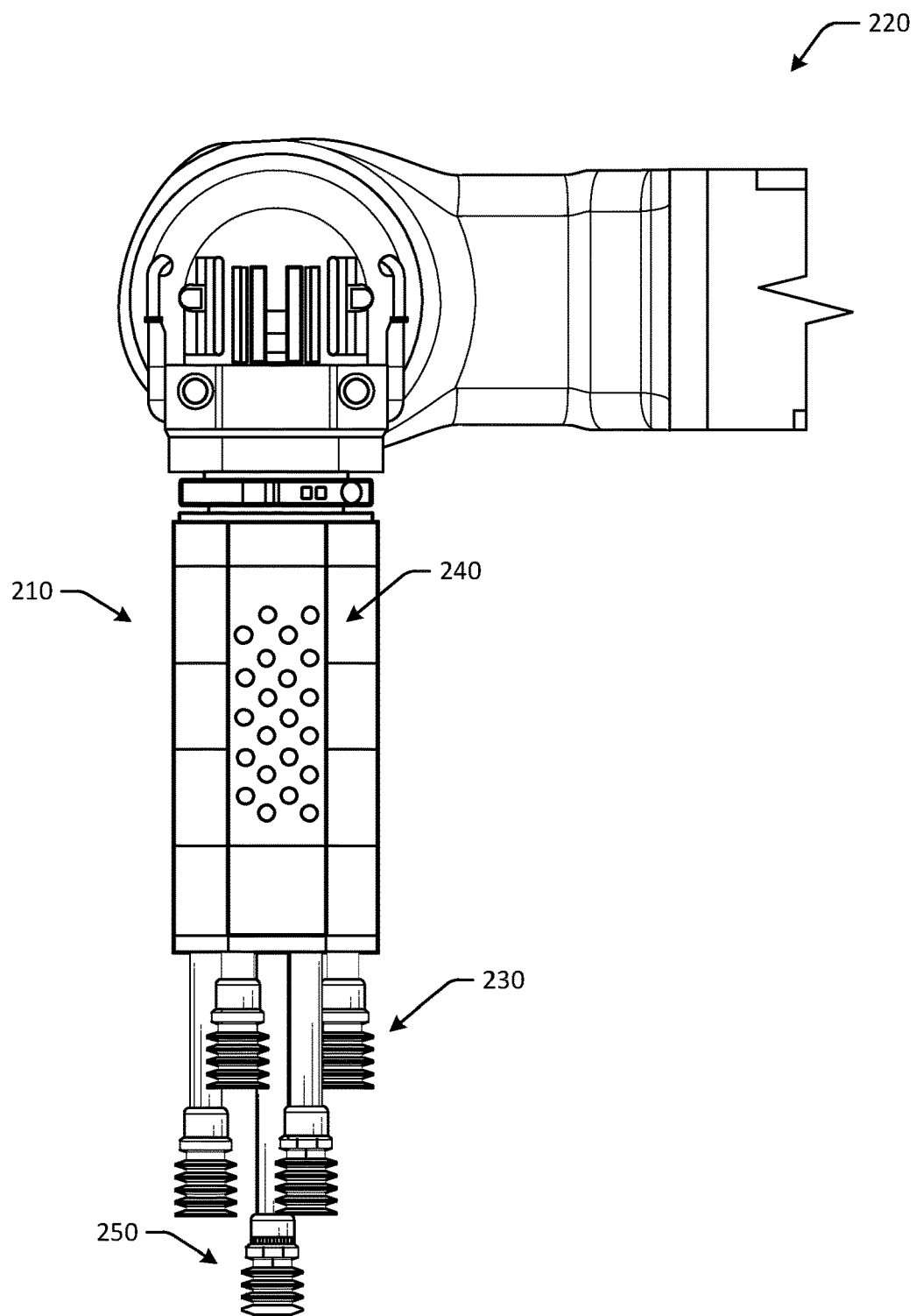

FIGS. 2A-2B are schematic illustrations of example use cases for concentric suction cup tools with integrated air chambers and/or integrated brake assemblies in accordance with one or more embodiments of the disclosure. Other embodiments may include additional or fewer components. The illustration of FIGS. 2A-2B may not be to scale, and may not be illustrated to scale with respect to other figures. The concentric suction cup tools with integrated air chambers and/or integrated brake assemblies illustrated in FIGS. 2A-2B may be the picking assemblies discussed with respect to FIG. 1.

In a use case 200 of FIG. 2A, a robotic picking assembly 210 may be coupled to a robotic arm 220 and may be used to pick up objects of various form factors and with different packaging materials (e.g., loose plastic bag packaging, boxes, etc.), as well as objects of different sizes and shapes, such as cylindrical objects, round objects, etc. Typically, picking up such different items using the same end-of-arm-tool or picking assembly may be difficult due to a number of factors, such as weight shifting during movement of the object (e.g., movement of an object in a loose bag packaging, leading to a change in center of gravity, etc. for the object), a geometry of the object or its packaging, and so forth. In addition, alignment of a suction cup in a typical picking assembly may be critical. Unlike typical picking assemblies, robotic picking assemblies described herein may not need to be aligned with objects in any particular manner, and may pick up such objects regardless of the loose bag packaging, and regardless of a shape or size of the object. In addition, embodiments may accurately grasp objects in cluttered environments, such as a container or bin with multiple items inside.

To accurately and repeatedly grasp items in cluttered environments, embodiments may include picking tools, such as the picking assembly 210, with concentric suction cups 230 having integrated air chambers and/or integrated brake assemblies. Individual pistons may be actuated depending on an amount of a target item (e.g., an item that is targeted for grasping, etc.) that is exposed, the shape and/or size of the target item, etc. The individual pistons may provide added flexibility in movement of the robotic arm or other device to which the picking assembly is coupled, such as a gantry or other device. Different shapes and configurations may be formed via the individual pistons that are actuated to an extended position. For example, a row of piston subassemblies and corresponding suction cups may be extended, an arc, semicircle, or circle of piston subassemblies and corresponding suction cups may be extended, individual piston subassemblies and corresponding suction cups may be extended, and so forth, based at least in part on imaging data indicative of a positioning and/or exposure of a target item (e.g., for instances where the target item is in a cluttered environment, etc.). In another example, as depicted in the close-up view of FIG. 2B, the picking assembly 210 may have suction cups 230 extended at different lengths or extended positions, where a center piston assembly 250 and corresponding suction cup may be disposed at a greater extended distance than one or more of the surrounding piston subassemblies. The picking assembly 210 may include one or more machine-readable codes 240, such as a fiducial, which may be disposed on a shell of the picking assembly 210. The machine-readable code 240 may be used for alignment of the picking assembly 210, positioning of the picking assembly 210, movement tracking of the picking assembly 210 and/or other purposes.

The picking assembly 210 may include a number of piston subassemblies, each of which may have a suction cup disposed at a distal end. The piston subassemblies may be arranged in a circular configuration with another piston subassembly disposed in the center, so as to form a concentric arrangement. Individual piston subassemblies may be actuated outwards relative to a shell to grasp an item. For example, a camera system may be used to image a target item. Based at least in part on the imaging, one or more of the piston subassemblies may be selected or otherwise determined for actuation from a retracted position within the shell of the picking assembly to an extended position, as illustrated in FIG. 2B. In the example of FIG. 2B, the picking assembly 210 is depicted with each of the piston subassemblies in a different extended position. The picking assembly 210 may be coupled to an airflow system that may provide vacuum flow or negative air pressure and/or airflow or positive air pressure to the individual piston subassemblies. The negative air pressure may flow through the suction cups coupled to the individual piston subassemblies, which may provide a force that can be used to grasp and lift items. To release items, for example onto a conveyor belt, the negative air pressure may be reduced and/or positive air pressure may be applied. In some embodiments, the positive air pressure may be used to cause piston subassemblies to extend, and negative air pressure may be used to cause piston subassemblies to retract.

To actuate individual piston subassemblies, the individual piston subassemblies may include integrated air chambers that may be used to actuate a portion of the piston subassembly outwards from the shell. The integrated air chambers may direct negative air pressure that can be used to retract the portion of the piston subassembly into the shell. The air chambers may use air provided from the airflow system or a different air flow. The air chambers may act as pistons for the piston subassemblies.

The robotic picking assembly of FIGS. 2A-2B may be positioned over or adjacent to a target object, and may be configured to pick up, move, and release objects. The robotic picking assembly may include a robotic arm and a picking assembly coupled to the robotic arm. The robotic arm may position the picking assembly roughly over or adjacent to the target object. The picking assembly may not need to be positioned in any specific location (e.g., a center, etc.) over the target object.

The robotic picking assembly may therefore be used to retrieve objects of different sizes, shapes, form factors, and/or having different types of packaging from one location to another without dropping or losing a grip on the object. Although certain example objects are illustrated in FIGS. 2A-2B, any suitable object can be picked up by embodiments of the disclosure, including off-center flat objects, round objects, long narrow objects, circular objects, and so forth.

Accordingly, some embodiments may include a controller configured to cause the picking assembly to pick up an object by positioning the picking assembly adjacent to an object (such as over a center, over a peripheral edge, or over another portion of the object), causing the airflow system to provide negative air pressure, actuating the picking assembly from a raised position to a lowered position, and causing the picking assembly to move upwards and/or in a lateral direction. For example, the picking assembly may be coupled to a computer system or a controller, which may or may not be the same controller of the robotic arm or other robotic manipulator. The controller may be configured to cause the picking assembly to pick up the item by determining a subset of piston subassemblies to actuate, causing the subset of piston subassemblies to actuate to the extended position, positioning the subset of piston subassemblies adjacent to the item, causing the vacuum suction system to provide negative air pressure, and causing the picking assembly to move upwards.

Figure 3:
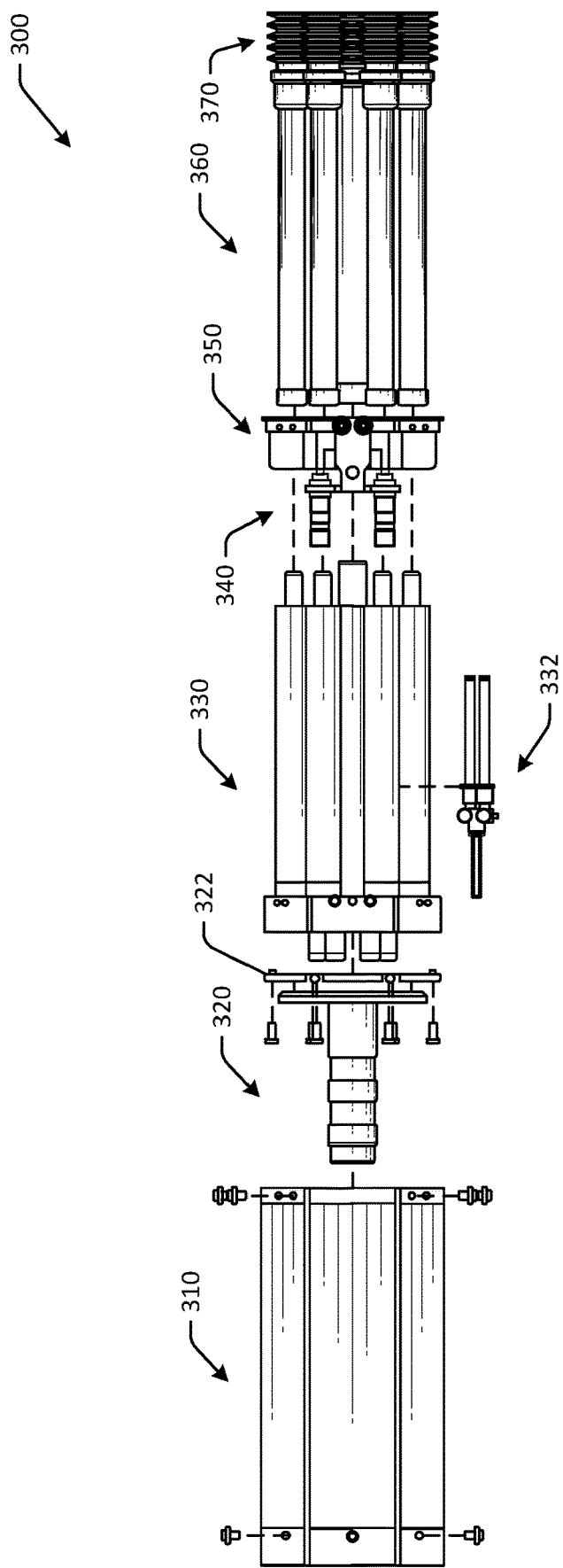
FIG. 3 is a schematic illustration of an example concentric suction cup picking assembly with integrated air chambers in exploded view in accordance with one or more embodiments of the disclosure.

FIG. 3 is a schematic illustration of an example concentric suction cup picking assembly with integrated air chambers and/or integrated brake assemblies in accordance with one or more embodiments of the disclosure. Other embodiments may include additional or fewer components. The illustration of FIG. 3 is not to scale, and may not be illustrated to scale with respect to other figures. The picking assembly illustrated in FIG. 3 may be the same picking assembly and/or concentric suction cup tools discussed with respect to FIGS. 1-2B.

In FIG. 3, a picking assembly 300 is depicted in exploded view. The picking assembly 300 may have integrated air chambers and/or an integrated brake assembly. The picking assembly 300 may be coupled to a robotic manipulator, such as a robotic arm, and may be coupled to an airflow system configured to provide positive air pressure and negative air pressure. The picking assembly 300 may be configured to grasp items using one or more suction cups.

The picking assembly 300 may include a shell 310. The shell 310 may be formed of a lightweight material, such as carbon fiber, plastic, composite materials, carbon-reinforced plastic, and/or other lightweight materials. The shell 310 may have any suitable geometric configuration, such as a cylindrical geometric configuration, a hexagonal geometric configuration, a rectangular geometric configuration, and so forth. The shell 310 may optionally be a load bearing shell. One or more machine readable codes, such as fiducials, markers, barcodes, RFIDs, and/or other types of machine readable codes may be disposed on the shell 310. The shell 310 may be formed of carbon fiber, plastic, aluminum, a composite material, or a different type of high strength low weight material. In some embodiments, the shell 310 may not be directly coupled to any of the piston subassemblies. The shell 310 may be a load bearing component, which may reduce stress on the piston subassemblies, and may improve a lifetime of the picking assembly.

The picking assembly 300 may include a vacuum manifold cap 320. The vacuum manifold cap 320 may be coupled to, or may otherwise include, a monolithic barb and a mounting ring. The vacuum manifold cap 320 may be configured to couple the picking assembly 300 to an airflow system. A gasket 322 may be coupled an interface between the vacuum manifold cap 320 and a vacuum manifold 330.

The vacuum manifold 330 may be configured direct airflow, such as positive air pressure flow and/or negative air pressure flow. The vacuum manifold 330 may include one or more integrated airflow paths, as discussed in detail with respect to FIG. 7. For example, the vacuum manifold 330 may include one or more air pressure paths that direct positive air pressure to individual piston subassemblies to cause the corresponding piston subassembly to extend. The vacuum manifold 330 may include one or more air pressure paths that direct negative air pressure or vacuum to individual piston subassemblies to cause the corresponding piston subassembly to retract. In some embodiments, the air pressure paths may be the same for positive air pressure and negative air pressure. The vacuum manifold 330 may include one or more air pressure paths that direct negative air pressure or vacuum to suction cups to provide suction. The vacuum manifold 330 may include one or more piston support pipes configured to receive individual piston subassemblies. In some embodiments, the vacuum manifold 330 may include one or more individual air cylinders that can engage with piston subassemblies to form a discrete vacuum chamber and discrete airflow chamber of the piston subassemblies. In other embodiments, the air cylinders may be coupled to the piston subassemblies and may be removably coupled to the vacuum manifold 330.

The vacuum manifold 330 may include one or more brake actuation airflow paths 332. The brake actuation airflow paths 332 may be configured to direct airflow to one or more brake actuators to cause a brake assembly to engage, as discussed with respect to FIGS. 8A-8C. In some embodiments, a single source of airflow may be used to provide positive air pressure and/or negative air pressure to various components of the picking assembly 300, thereby reducing complexity by removing the need for multiple air sources and corresponding air lines.

The picking assembly 300 may include an integrated brake assembly 350. The brake assembly 350 may be configured to restrict movement of individual piston subassemblies, such as axial movement and/or lateral movement. The brake assembly 350 may include one or more actuators 340 configured to cause the brake assembly 350 to engage and/or disengage responsive to air pressure, as discussed with respect to FIGS. 8A-8C.

The picking assembly 300 may include one or more piston subassemblies 360. Individual piston subassemblies 360 may include respective suction cups 370 disposed at the distal ends of the individual piston subassemblies 360. The piston subassemblies 360 may extend and/or retract independent of each other. The piston subassemblies 360 may extend based at least in part on positive air pressure and may retract based at least in part on negative air pressure. In some embodiments, negative air pressure may not be needed to secure a piston subassembly in a fully retracted position due to a valve that secures the piston subassembly in the fully retracted position using manifold vacuum pressure, as discussed with respect to FIG. 5B. Any number of individual piston subassemblies 360 may be included and may be arranged or otherwise disposed in a parallel arrangement. The picking assembly 300 may include any number of suction cups 370.

The suction cups 370 may be compliant components that may be used to grasp objects of different shapes, sizes, and materials. Each individual suction cup 370 may have its own compliance to assist with item deformation. As a result, positioning of the picking assembly during picking operations may be less critical. The picking assembly may be lightweight to improve repeatability. For example, the picking assembly may have a total weight of less than about 5 pounds, and individual piston subassemblies may have a weight of about 100 grams. In addition, the lifting capacity of the system is improved, as a reduced weight increases the amount of mass the robot can lift (e.g., the total lift capacity may be unchanged, but a heavier item can be lifted due to a reduced weight of the picking assembly, etc.) The shell 310 may improve rigidity of the picking assembly and may resist shearing or twisting of the piston subassemblies.

The picking assembly 300 may include a number of piston subassemblies arranged in a circular, and sometimes concentric, arrangement, as illustrated. In other embodiments, the piston subassemblies may be arranged so as to surround or otherwise encircle a center piston subassembly, and may form various arrangements, such as a circular arrangement, a triangular arrangement, a rectangular arrangement, a linear arrangement, and so forth. Some or all, or each, of the piston subassemblies may be coupled to respective suction cups.

In some embodiments, the picking assembly 300 may include a single suction cup and corresponding piston subassembly, along with the brake assembly 350. In other embodiments, the picking assembly 300 may include a single extendable piston assembly and suction cup, along with one or more additional static or passive (e.g., spring-loaded, etc.) suction cup assemblies and the brake assembly 350. Various combinations thereof of extendable piston subassemblies, static or passive suction cup assemblies, and/or brake assemblies may be used.

The picking assembly 300 may therefore be configured to pick up and release objects. The picking assembly 300 may include the vacuum manifold 330 having a first integrated air pressure path and a second integrated air pressure path. The picking assembly 300 may include a first piston subassembly having a first air pipe, a first vacuum pipe, a first bushing disposed between the first air pipe and the first vacuum pipe, and a first suction cup. The first piston subassembly may be configured to independently actuate from a retracted position to an extended position. The picking assembly 300 may include a second piston subassembly having a second air pipe, a second vacuum pipe, a second bushing disposed between the second air pipe and the second vacuum pipe, and a second suction cup. The second piston subassembly is configured to independently actuate from the retracted position to the extended position. As discussed with respect to FIG. 7, the first integrated air pressure path may direct both positive and negative airflow to the first air pipe, and the second integrated air pressure path may direct both positive and negative airflow to the second air pipe. Positive airflow in the air pipes may cause the respective piston subassembly to extend, and negative airflow in the air pipes may cause the respective piston subassembly to retract. Negative airflow in the vacuum pipes may provide suction at the respective suction cups.

In some embodiments, the picking assembly 300 may be extendable in length by about 50%, and the picking assembly 300 may have a weight-to-extended length ratio of between about 0.025 lb/inch and about 0.50 lb/inch, such as about 0.0398 lb/inch, or 0.04 lb/in. For example, the picking assembly 300 may have an extendable length that is about 50% greater than a retracted length. For example, a retracted length may be about 300 millimeters, and an extended length may be about 450 millimeters, or about 18 inches, for an extendibility of about 50%. Due to improved rigidity and structural integrity of the picking assembly, the picking assembly may have a weight-to-extended length ratio of between about 0.25 lb/inch and about 0.30 lb/inch. For example, at a weight of 5 pounds and extended length of 18 inches, the picking assembly may have a weight-to-extended length ratio of 0.28 lb/inch. In an example embodiment, the picking assembly may have a diameter of between about 4 inches and about 8 inches, which may correspond to a density proxy of the picking assembly. The improved strength and rigidity may provide the ability to lift relatively heavy items without damaging the picking assembly. In an example, objects weighing over 50 pounds may be lifted and moved using the picking assembly while maintaining a slim profile and relatively tight spacing between adjacent suction cups and/or piston subassemblies. The reduced weight also improves repeatability and lifespan of the picking assembly, as well as the available lifting capacity of the system.

Although illustrated as a single piston subassembly disposed in a center surrounded by six piston subassemblies disposed in a circular arrangement about the center piston subassembly, any number of piston subassemblies may be used, and any number of circular formations may be used. Other configurations, such as arrays, rectangles, random patterns, and other configurations of piston subassemblies may be included.

Although a single picking assembly is illustrated in FIG. 3, in some embodiments, more than one picking assembly may be used in conjunction with each other to pick up objects. For example, some embodiments may include multiple picking assemblies arranged in an array or in a vertically offset arrangement to pick up objects.

Figure 4:
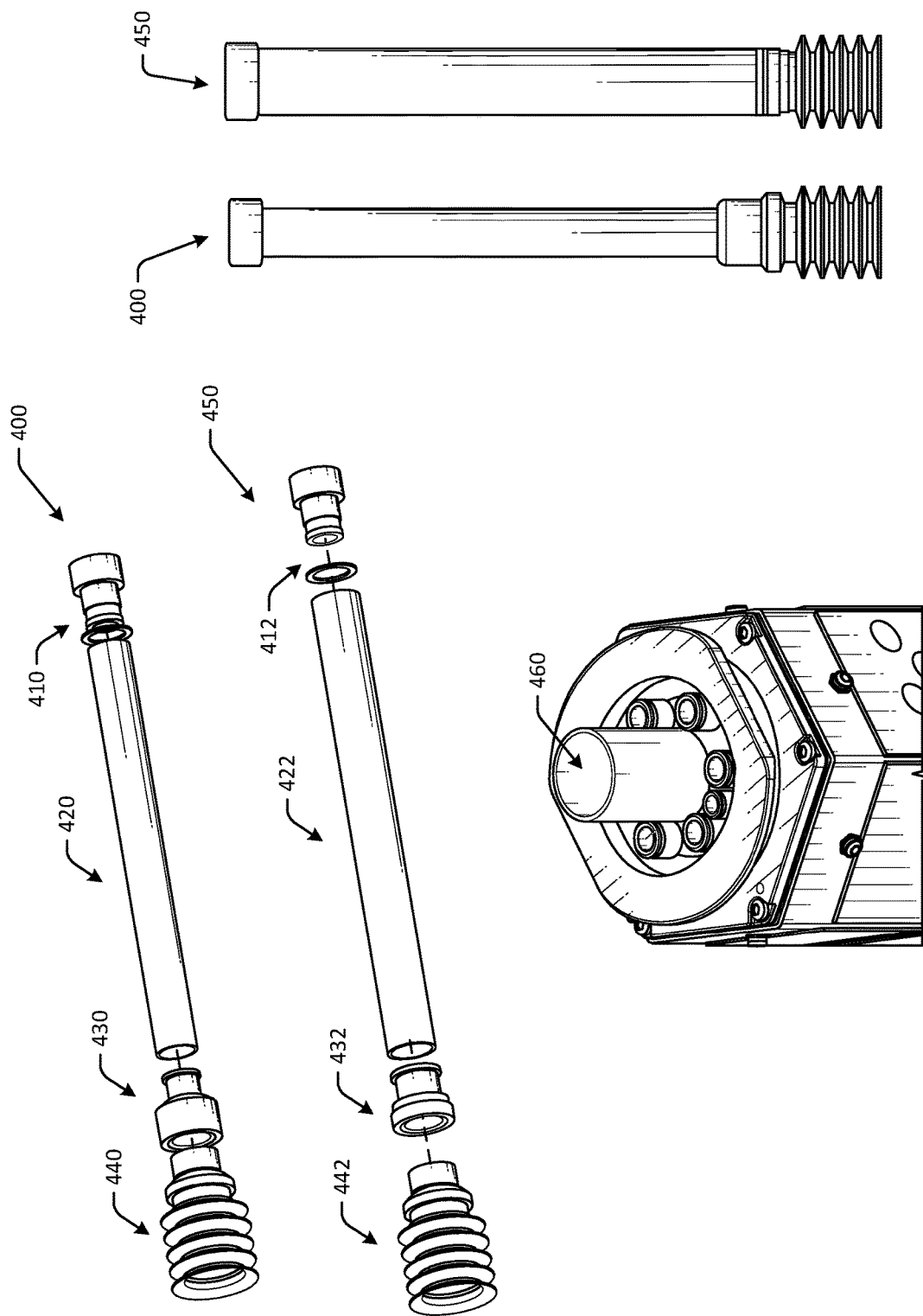
FIG. 4 is a schematic illustration of individual piston subassemblies and a perspective view of an airflow coupler for a picking assembly in accordance with one or more embodiments of the disclosure.

FIG. 4 is a schematic illustration of individual piston subassemblies and a perspective view of an airflow coupler for a picking assembly in accordance with one or more embodiments of the disclosure. Other embodiments may include additional or fewer components. The illustration of FIG. 4 is not to scale, and may not be illustrated to scale with respect to other figures. The components illustrated in FIG. 4 may be components of the picking assemblies discussed with respect to FIGS. 1-3.

In FIG. 4, a first piston subassembly 400 and a second piston subassembly 450 are depicted in exploded and front view. The first piston subassembly 400 may have a first cylindrical shell 420 having a first diameter. The second piston subassembly 450 may have a second cylindrical shell 422 having a second diameter. Other embodiments may have different cross-sectional geometries of shells. The second diameter may be greater than the first diameter. The second piston subassembly 450 may be a center piston subassembly, where one or more perimeter piston subassemblies are disposed in an arrangement, such as a circular or hexagonal arrangement, around the center piston subassembly. The first piston subassembly 400 may be a perimeter piston subassembly. The center piston subassembly may have a greater diameter than the perimeter piston subassemblies. The center piston subassembly, which may be the second piston subassembly 450, may have a first airflow rate that is greater than a second airflow rate of the first piston subassembly 400.

The first piston subassembly 400 may include a first bushing 410 that may be coupled to a first end, such as a proximal end, of the first cylindrical shell 420. The first piston subassembly 400 may include a first coupler 430 configured to couple the first cylindrical shell 420 to a first suction cup 440. The first coupler 430 may be coupled to a second end of the first cylindrical shell 420, such as a distal end. The first suction cup 440 may be coupled to the first cylindrical shell 420 via the first coupler 430.

The second piston subassembly 450 may include a second bushing 412 that may be coupled to a first end, such as a proximal end, of the second cylindrical shell 422. The second piston subassembly 450 may include a second coupler 432 configured to couple the second cylindrical shell 422 to a second suction cup 442. The second coupler 432 may be coupled to a second end of the second cylindrical shell 422, such as a distal end. The second suction cup 442 may be coupled to the second cylindrical shell 422 via the second coupler 432.

A picking assembly may include an airflow coupler 460 that may be configured to couple the picking assembly to an airflow source, where the airflow coupler 460 may direct air to the first piston subassembly 400 and the second piston subassembly 450. Positive airflow may be directed to slide the respective bushing towards a distal end of the piston, thereby causing extending of the piston, and negative airflow may be directed to cause the respective bushing to slide towards a proximal end of the piston. The airflow coupler 460 may have a first configuration, such as a first geometry, first dimension(s), a first connector type, and so forth. In the illustrated embodiment, the airflow coupler 460 may be disposed at an upper end of the picking assembly, such as at a top end of the picking assembly. The airflow coupler 460 may therefore couple an airflow source to the picking assembly at a top end of the picking assembly. In some embodiments, a vacuum source or vacuum system may be coupled to the picking assembly at the airflow coupler 460.

Figure 5A:
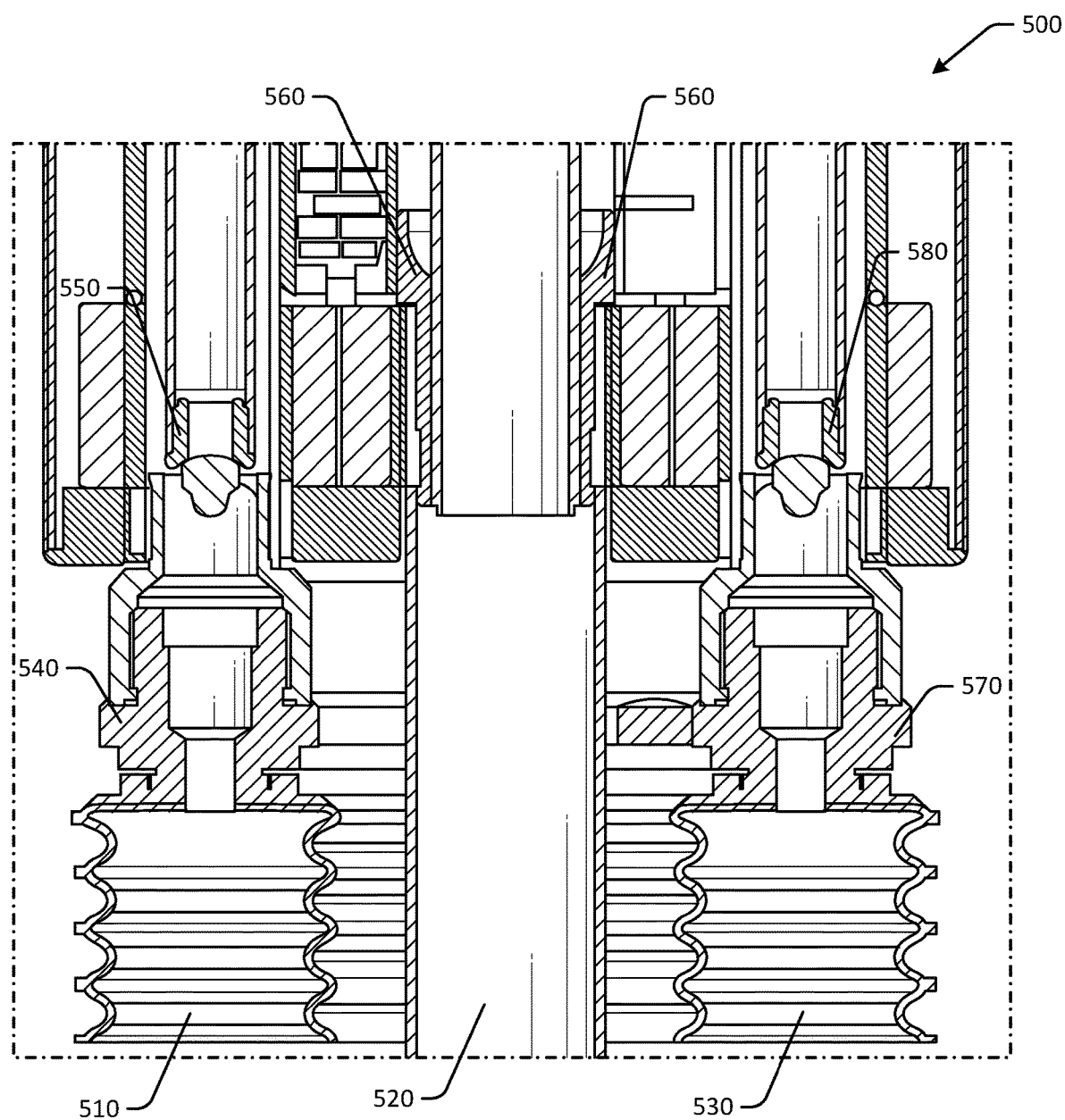
FIGS. 5A-5B are schematic illustration of cross-sectional and other views of piston subassemblies in a retracted position in accordance with one or more embodiments of the disclosure.
Figure 5B:
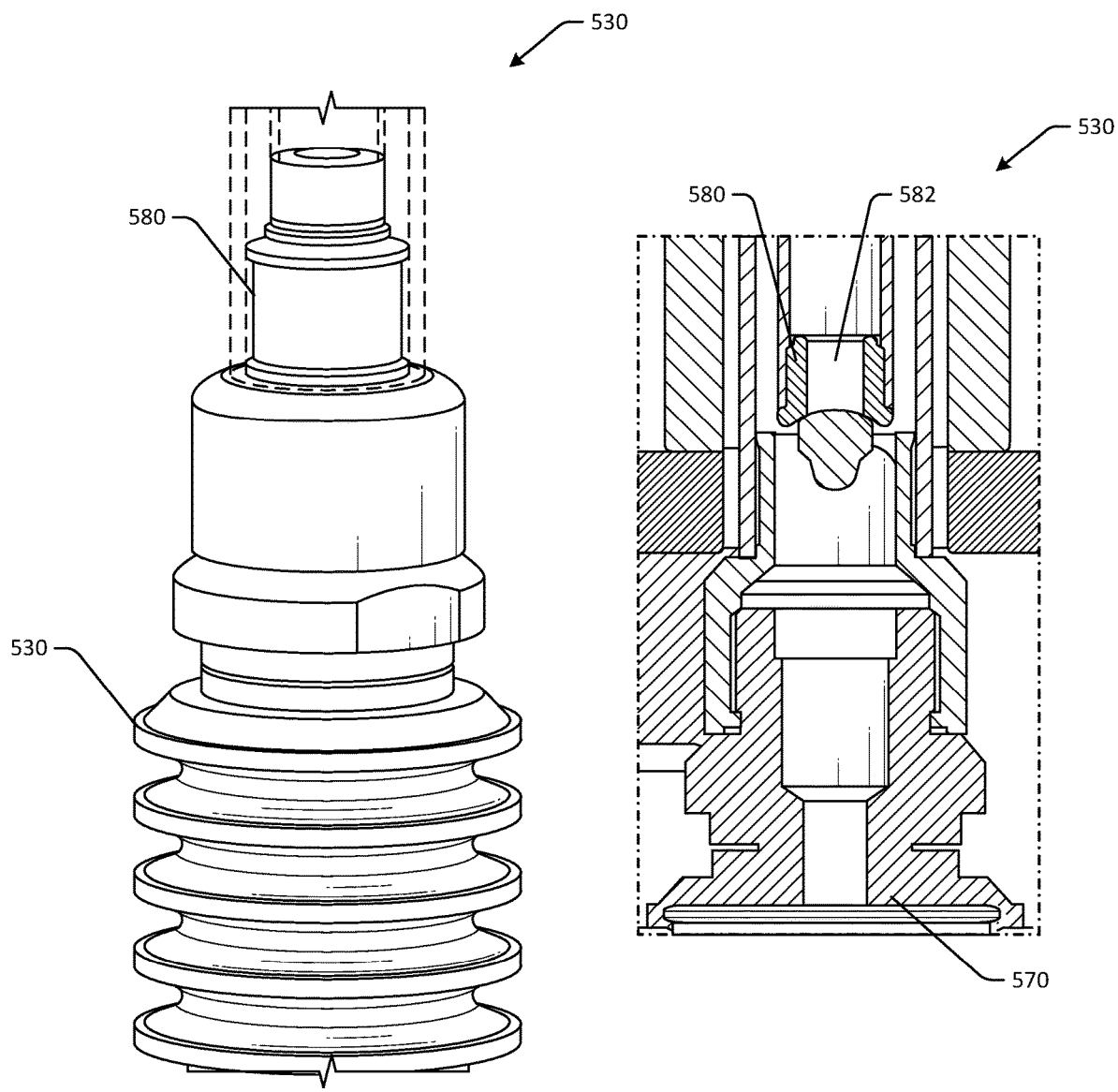

FIGS. 5A-5B are schematic illustration of cross-sectional and other views of piston subassemblies in a retracted position in accordance with one or more embodiments of the disclosure. Other embodiments may include additional or fewer components. The illustrations of FIGS. 5A-5B are not to scale, and may not be illustrated to scale with respect to other figures. The components illustrated in FIGS. 5A-5B may be components of the picking assemblies discussed with respect to FIGS. 1-4.

In FIG. 5A, a picking assembly 500 is depicted in a cross-sectional view. The picking assembly 500 may be a robotic picking assembly and may be coupled to a robotic manipulator and/or a vacuum suction system configured to provide positive air pressure and negative air pressure. The picking assembly 500 may be configured to pick up and release objects.

The picking assembly 500 may include a center piston subassembly 520, a first outer piston subassembly 510, and a second outer piston subassembly 530, where the outer piston subassemblies may be perimeter subassemblies disposed about the center piston subassembly 520.

The first outer piston subassembly 510 and the second outer piston subassembly 530 may include integrated valves that block airflow through the corresponding suction cup when the respective piston subassemblies are in a retracted position. For example, the first outer piston subassembly 510 may include a first valve 540, where the first valve 540 may be part of the coupler of the first outer piston subassembly 510 (e.g., the coupler that couples the suction cup to the cylindrical shell, etc.), or may be otherwise coupled to the cylindrical shell. In some embodiments, the center piston subassembly 520 may or may not include an integrated valve. The first valve 540 may be disposed in an airflow pipe of the first outer piston subassembly 510. The first valve 540 may engage a first vacuum pipe 550 of the first outer piston subassembly 510.

The first valve 540 may be integrated with the first outer piston subassembly 510, and, when the first outer piston subassembly 510 is in a retracted position, such as that illustrated in FIG. 5A, the first valve 540 may block airflow through the suction cup and/or the first vacuum pipe 550 of the first outer piston subassembly 510. As a result, vacuum supply to the first outer piston subassembly 510 may be shut off once retracted, as vacuum manifold pressure may retain the first outer piston subassembly 510 in the retracted position. The first valve 540 may prevent airflow through a vacuum pipe (thereby removing suction at the suction cup) of the first outer piston subassembly 510 when the first outer piston subassembly 510 is in the retracted position.

The second outer piston subassembly 530 may include a second valve 570, where the second valve 570 may be part of the coupler of the second outer piston subassembly 530 (e.g., the coupler that couples the suction cup to the cylindrical shell, etc.), or may be otherwise coupled to the cylindrical shell. The second valve 570 may be disposed in an airflow pipe of the second outer piston subassembly 530. The second valve 570 may engage a second vacuum pipe 580 of the second outer piston subassembly 530.

The second valve 570 may be integrated with the second outer piston subassembly 530, and, when the second outer piston subassembly 530 is in a retracted position, such as that illustrated in FIG. 5A, the second valve 570 may block airflow through the suction cup and/or the second vacuum pipe 580 of the second outer piston subassembly 530. As a result, vacuum supply to the second outer piston subassembly 530 may be shut off once retracted, as vacuum manifold pressure may retain the second outer piston subassembly 530 in the retracted position. The second valve 570 may prevent airflow through a vacuum pipe of the first outer piston subassembly 510 when the second outer piston subassembly 530 is in the retracted position. As depicted in the detail view of FIG. 5B, the second valve 570 may block an airflow path 582 of the second vacuum pipe 580.

Figure 6A:
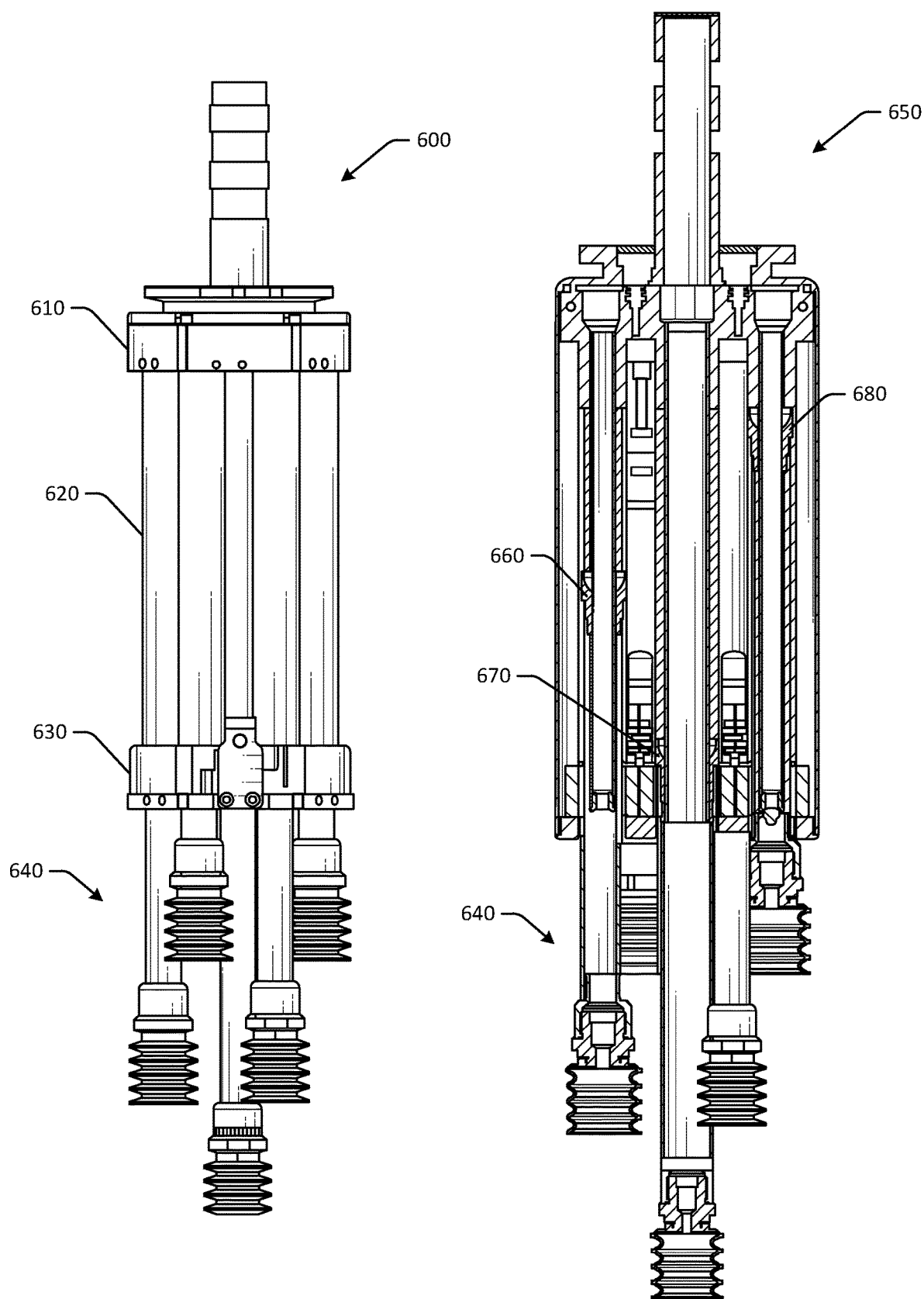
FIG. 6A depicts schematic illustrations of an example picking assembly with piston subassemblies at various extended positions in accordance with one or more embodiments of the disclosure.
Figure 6B:
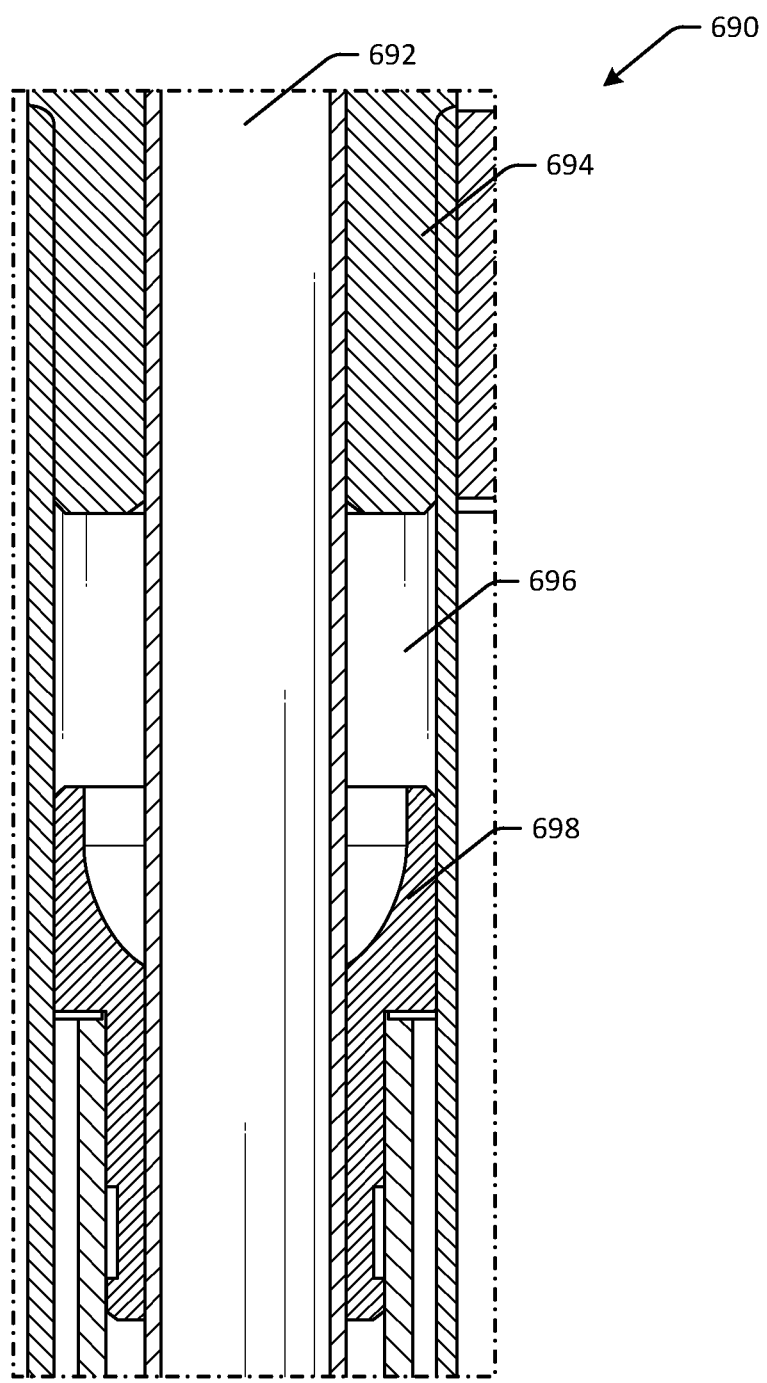
FIG. 6B depicts a schematic illustration of a slideable bushing of a piston subassembly in accordance with one or more embodiments of the disclosure.

FIG. 6A depicts schematic illustrations of an example picking assembly with piston subassemblies at various extended positions in accordance with one or more embodiments of the disclosure. FIG. 6B depicts a schematic illustration of a slideable bushing of a piston subassembly in accordance with one or more embodiments of the disclosure. Other embodiments may include additional or fewer components. The illustrations of FIGS. 6A-6B are not to scale, and may not be illustrated to scale with respect to other figures. The components illustrated in FIGS. 6A-6B may be components of the picking assemblies discussed with respect to FIGS. 1-5B.

In FIG. 6A, a picking assembly 600 is depicted in front view and in a cross-sectional view 650. The picking assembly 600 may include a vacuum manifold 610, a shell 630, an integrated brake assembly 630, and one or more suction cup assemblies 640. Individual suction cup assemblies 640 may be individual piston subassemblies.

The individual piston subassemblies may be actuated to different extended positions via slideable bushings that cause extension of a piston subassembly. In the cross-sectional view 650 of FIG. 6A, a number of piston subassemblies are depicted at different extended positions. The different positions can be achieved via both positive and negative air pressure directed to an air chamber of the respective piston subassembly that causes movement of the corresponding bushing to a particular position. For example, a first bushing 660 may be disposed at a particular position, where the first bushing 660 slides relative to a vacuum pipe of the piston subassembly. Positive and negative air pressure in the air chamber of the piston subassembly causes the first bushing 660 to slide to a desired position, which in turn causes extension of the suction cup coupled to the piston subassembly. Similarly, a second bushing 680 may be disposed at a particular position, where the second bushing 680 slides relative to a vacuum pipe of the piston subassembly. Air pressure in the air chamber of the piston subassembly causes the second bushing 680 to slide to a desired position, which in turn causes extension of the suction cup coupled to the piston subassembly. For the center piston subassembly, a third bushing 670 may be disposed at a particular position, where the third bushing 670 slides relative to a vacuum pipe of the piston subassembly. Air pressure in the air chamber of the piston subassembly causes the third bushing 670 to slide to a desired position, which in turn causes extension of the suction cup coupled to the piston subassembly. For retraction, vacuum pressure may be used to retract the respective bushings, or, vacuum pressure may be used to retract the suction cup of a piston subassembly while positive air pressure holding the bushing in place is cut off, allowing the bushing to passively slide to a retracted position. Vacuum may be provided to the respective suction cups via the vacuum pipes. When vacuum is provided to the suction cups, the piston subassemblies may have a retracting effect, which may be prevented by the brake assembly.

Accordingly, a first piston subassembly may be configured to actuate to an extended position responsive to positive air pressure in a first air pipe of the first piston subassembly (thereby causing the first bushing to slide), and to actuate to the retracted position responsive to negative air pressure in the first air pipe. The second piston subassembly may be configured to actuate to the extended position responsive to positive air pressure in a second air pipe of the second piston subassembly (thereby causing the second bushing to slide), and to actuate to the retracted position responsive to negative air pressure in the second air pipe.

In FIG. 6B, a cross-sectional view 690 of a piston subassembly is depicted. The piston subassembly may include a vacuum pipe 692, an air pipe 696, and a bushing 698, where the piston subassembly is coupled to a vacuum manifold 694. The vacuum pipe 692 may be disposed inside the air pipe 696, such as in a concentric arrangement. The vacuum pipe 692 may direct negative air pressure from the vacuum manifold 694 to a suction cup of the piston subassembly. The air pipe 692 may direct positive air pressure from the vacuum manifold 694 to impart movement to the bushing 698.

Positive air pressure may flow from the vacuum manifold 694 into the air pipe 696 and cause the bushing 698 to remain in a certain position and/or to cause the piston subassembly to extend. Negative air pressure may flow from the vacuum manifold 694 into the vacuum pipe 692 for suction, and may flow into the air pipe 696 to cause the piston subassembly to retract and/or cause the bushing 698 to slide towards the vacuum manifold 694.

The piston subassembly may therefore be a first piston subassembly having a first air pipe, a first vacuum pipe, a first bushing disposed between the first air pipe and the first vacuum pipe, and a first suction cup, where the first piston subassembly is configured to independently actuate from a retracted position to an extended position. The first vacuum pipe may be disposed in the first air pipe, such that a chamber (e.g., interior portion of the air pipe 696, etc.) is formed between an outer surface of the first vacuum pipe and an inner surface of the first air pipe. Airflow from the first integrated air pressure path may flow into the chamber. The bushings may slide relative to the vacuum pipes. Airflow in the air pipe may cause the bushing to slide towards or away from a distal end of the piston subassembly.

Similarly, a second piston subassembly may include a second air pipe, a second vacuum pipe, a second bushing disposed between the second air pipe and the second vacuum pipe, and a second suction cup, where the second piston subassembly is configured to independently actuate from the retracted position to the extended position. The vacuum manifold 695 may have a first integrated air pressure path that directs airflow to the first air pipe, and a second integrated air pressure path that directs airflow to the second air pipe. The second vacuum pipe may be disposed in the second air pipe, such that a chamber is formed between an outer surface of the second vacuum pipe and an inner surface of the second air pipe. The bushings may slide relative to the vacuum pipes. Airflow in the air pipe may cause the bushing to slide towards or away from a distal end of the piston subassembly.

Figure 7:
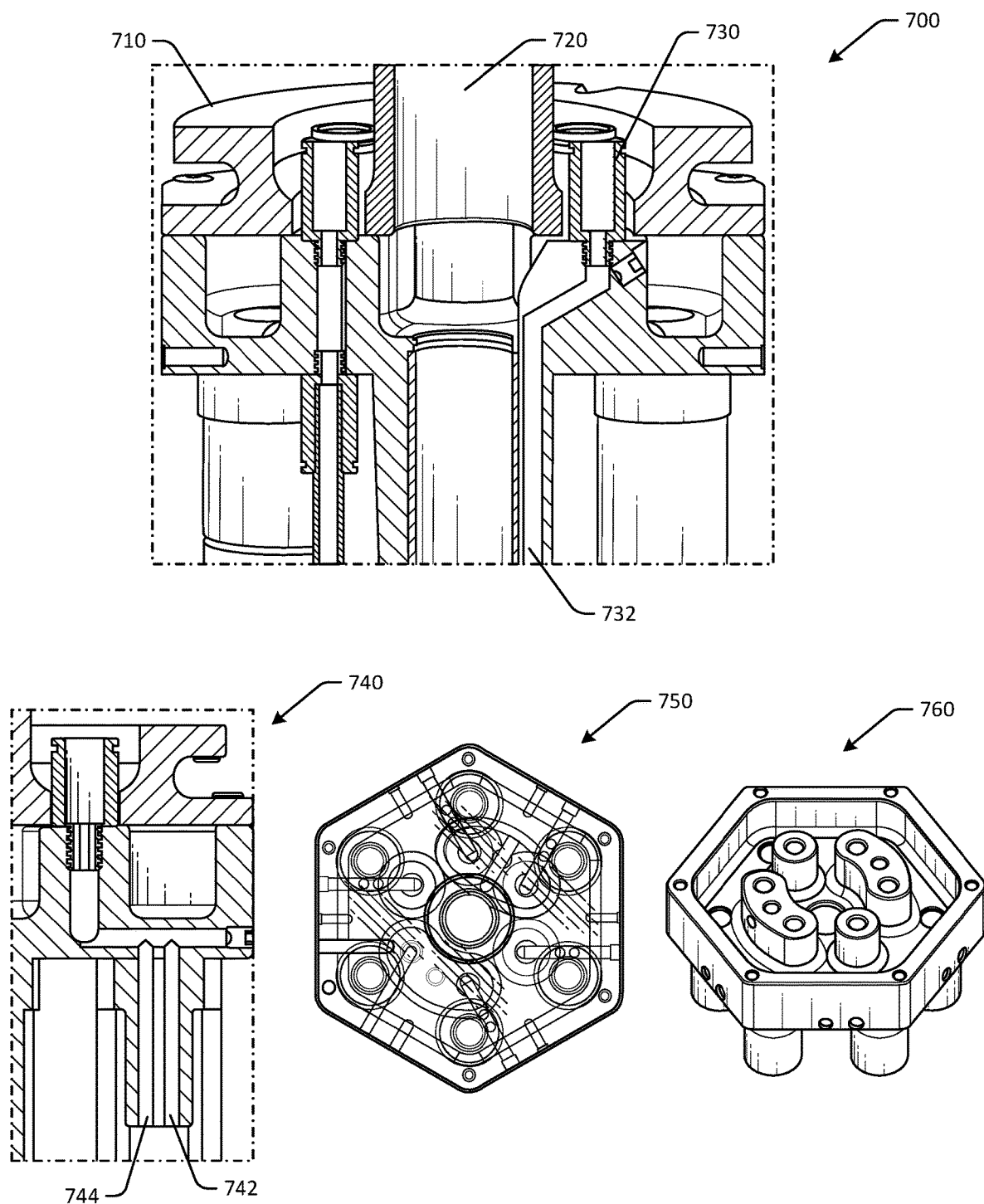
FIG. 7 is a schematic illustration of a vacuum manifold in various views in accordance with one or more embodiments of the disclosure.

FIG. 7 is a schematic illustration of a vacuum manifold 700 in various views in accordance with one or more embodiments of the disclosure. Other embodiments may include additional or fewer components. The illustration of FIG. 7 is not to scale, and may not be illustrated to scale with respect to other figures. The components illustrated in FIG. 7 may be components of the picking assemblies discussed with respect to FIGS. 1-6B.

In FIG. 7, the vacuum manifold 700 may have an upper surface 710, an adapter 720 configured to engage an airflow source, and one or more integrated air pressure paths, such as a first integrated air pressure path 730, a second integrated air pressure path, and so forth as visible in partially transparent top view 750. A perspective top view 760 of the vacuum manifold 700 depicts various inlets for airflow from an external airflow source. The integrated air pressure paths may be directed to individual piston subassemblies, as well as optionally to one or more actuators for a brake assembly. For example, the first integrated air pressure path 730 may direct air pressure to an air pipe 732 of a piston subassembly, such as a center piston subassembly, and another integrated air pressure path 734 may direct air pressure to one or more actuators for a brake assembly. Positive airflow from the first integrated air pressure path may cause the first bushing to slide towards a distal end of the first piston subassembly, and negative airflow from the first integrated air pressure path may cause the first bushing to slide towards a proximal end of the first piston subassembly.

As depicted in cross-sectional view 740, airflow holes may be doubled, such as a first airflow hole 742 and a second airflow hole 744 for perimeter or outer piston subassemblies to overcome leakage. The center piston subassembly may not have double airflow holes.

Accordingly, in an embodiment, the vacuum manifold 700 may have a first integrated air pressure path, a second integrated air pressure path, and a third integrated air pressure path. The first integrated air pressure path may direct airflow to actuate a first piston subassembly, the second integrated air pressure path may direct airflow to actuate the second piston subassembly, and the third air integrated air pressure path may direct airflow to the brake assembly, and where the airflow causes the brake assembly to engage.

Figure 8A:
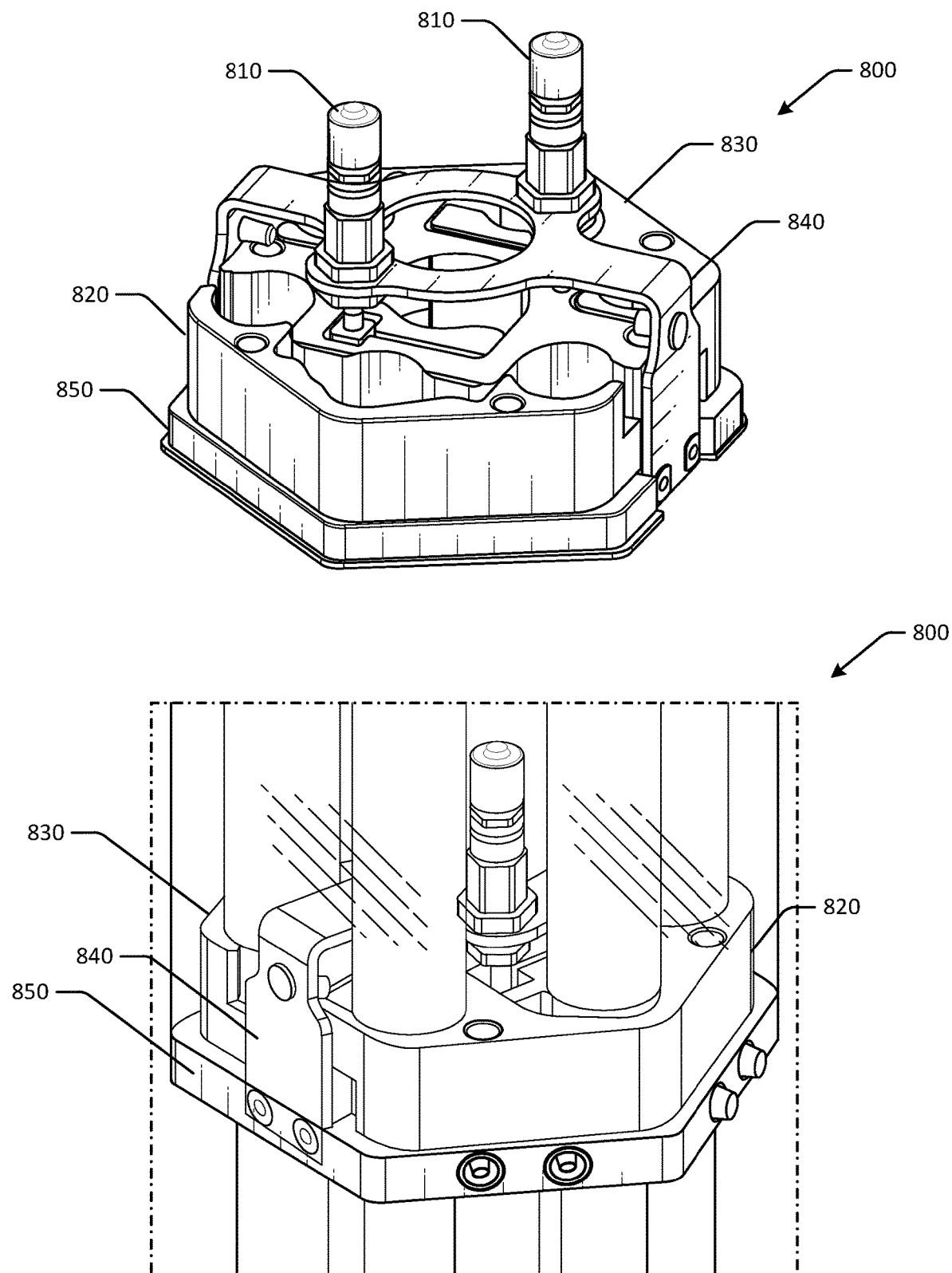
FIGS. 8A-8C are schematic illustrations of an integrated brake assembly in various views in accordance with one or more embodiments of the disclosure.
Figure 8B:
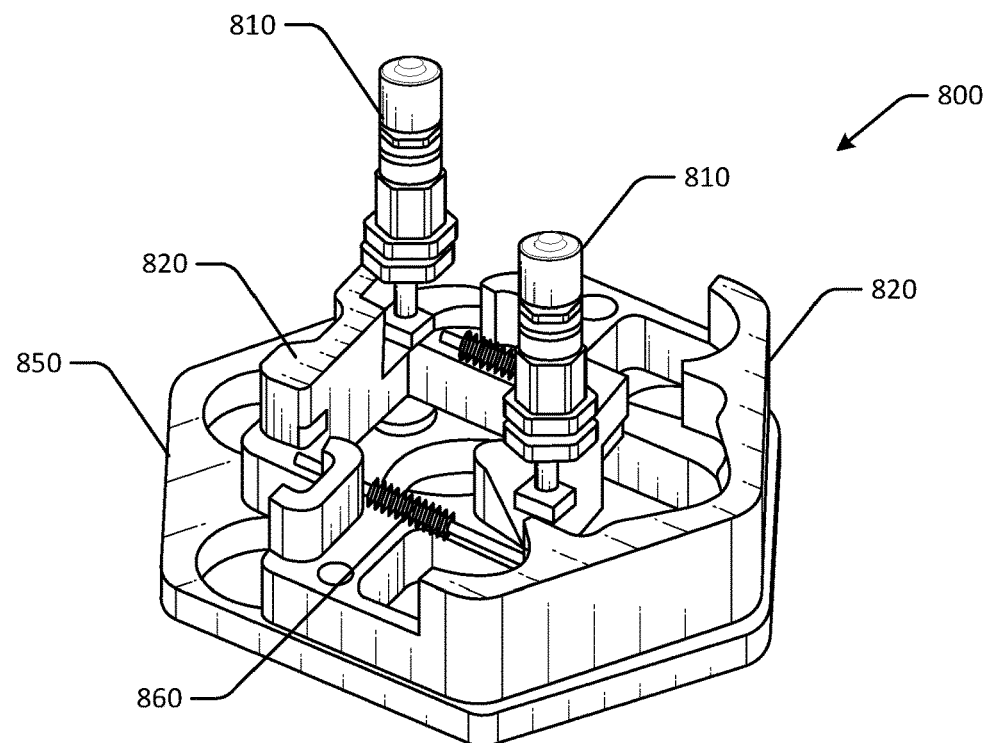
Figure 8B:
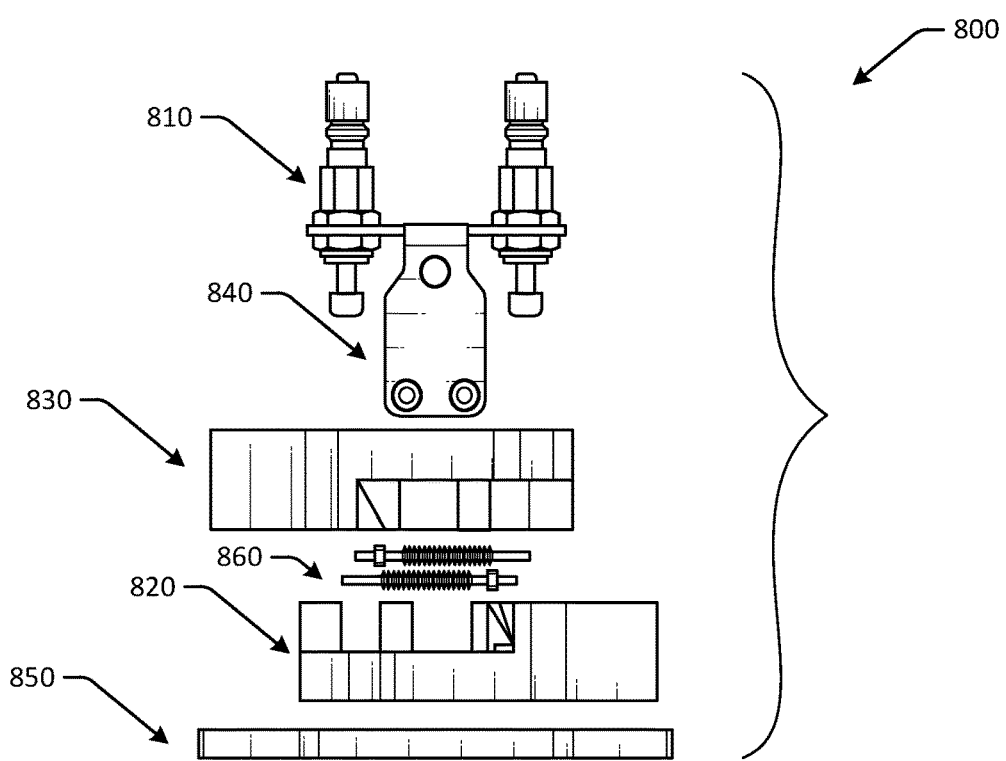
Figure 8C:
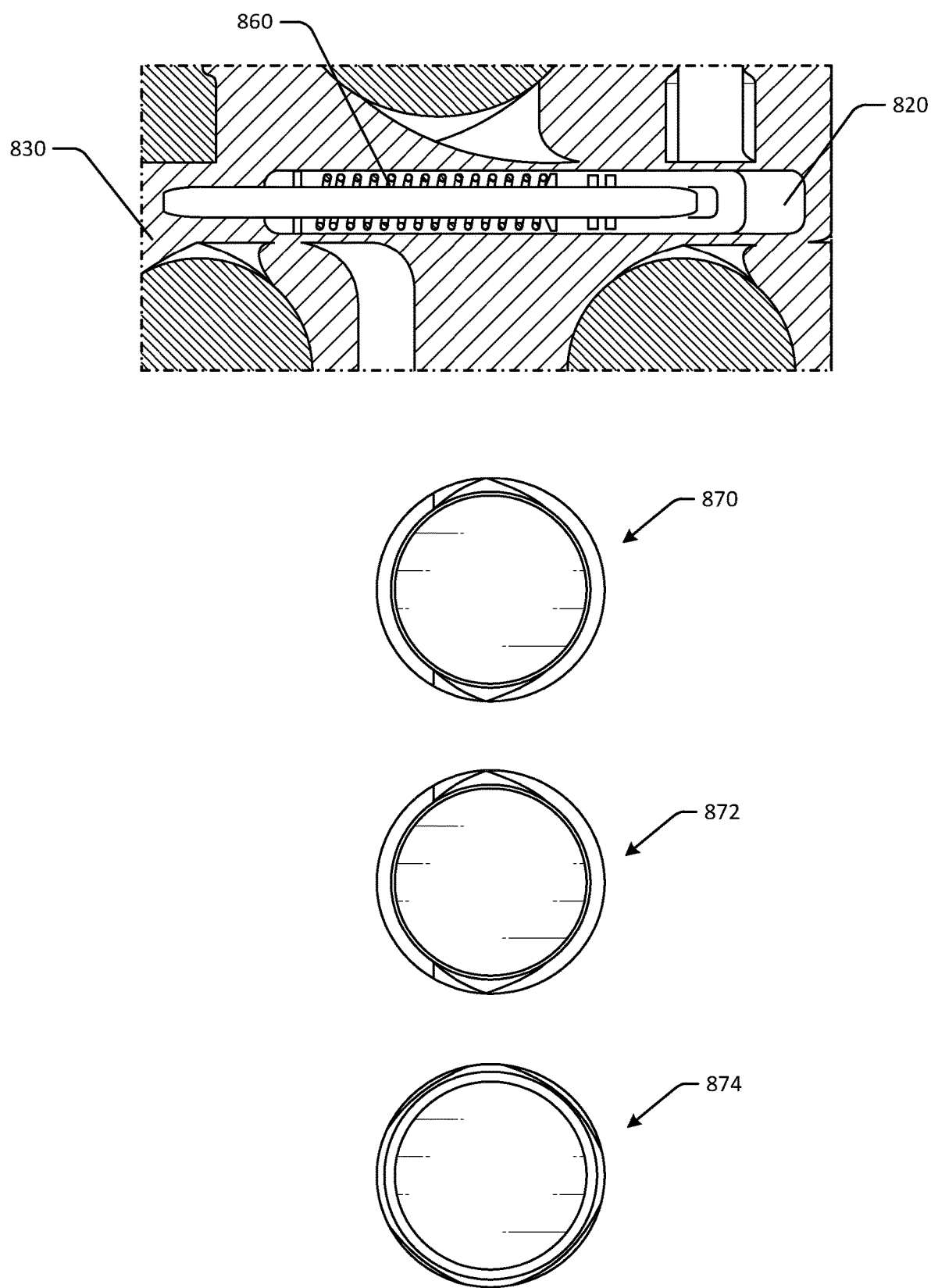

FIGS. 8A-8C are schematic illustrations of an integrated brake assembly 800 in various views in accordance with one or more embodiments of the disclosure. Other embodiments may include additional or fewer components. The illustrations of FIGS. 8A-8C are not to scale, and may not be illustrated to scale with respect to other figures. The components illustrated in FIGS. 8A-8C may be components of the picking assemblies discussed with respect to FIGS. 1-7.

In FIG. 8A, the integrated brake assembly 800 is depicted in perspective views. The integrated brake assembly 800 may be integrated with a picking assembly as shown on the lower portion of FIG. 8A. The integrated brake assembly 800 may include a first portion 820 and a second portion 830 that may together engage outer surfaces of one or more piston subassemblies, such as outer surfaces of air pipes or cylindrical shells, to act as a brake and prevent axial and/or lateral movement of the piston subassemblies. The first portion 820 and/or the second portion 830 may be formed of plastic or another lightweight material. The first portion 820 and/or the second portion 830 may slide relative to the other portion, such as towards the other portion, so as to compress one or more piston subassemblies between the first portion 820 and/or the second portion 830.

The integrated brake assembly 800 may include a support 840 coupled to a base 850, where the support 840 may be configured to support the first portion 820 and/or the second portion 830.

The integrated brake assembly 800 may include one or more actuators 810, which may be pistons. The actuators 810 may be configured to actuate the first portion 820 toward the second portion 830, and/or the second portion 830 toward the first portion 820. In some embodiments, a first actuator 810 may actuate the first portion 820 toward the second portion 830, and a second actuator 810 may actuate the second portion 830 toward the first portion 820. The actuator 810 may be actuated using air pressure from the vacuum manifold of a picking assembly. Other embodiments may include different types of actuators, such as an electromagnetic actuator (e.g., motors, solenoids, etc.), a hydraulic actuator, a cable-driven actuator, and/or other types of actuators. Other brake assembly configurations may include single piece configurations, rotating configurations, and the like. For example, the brake assembly may include a single disk that slides or reciprocates to prevent axial piston movement, a single disk that rotates about an offset from center to prevent axial piston movement, an inflatable brake that expands towards the pistons to prevent axial piston movement, and the like. Some brake assemblies may brake some, but not all, of the piston assemblies, such as a center piston, whereas other brake assemblies may brake all of the piston assemblies.

As depicted in FIG. 8B, the integrated brake assembly 800 may include one or more springs 860, such as a first spring that biases the first portion 820 away from the second portion 830 and/or a second spring that biases the second portion 830 away from the first portion 820. Accordingly, when the actuators 810 or unactuated and/or air pressure is removed, the springs 860 may cause the brake to disengage from the piston subassemblies.

As depicted in the exploded view of FIG. 8B, the first portion 820 and the second portion 830 may be disposed at least partially on different planes. For example, a first concave surface or first recessed portion on the first portion may be disposed on a first plane, and a second concave surface or a second recessed portion of the second portion may be disposed on a second plane. In some embodiments, the first portion and the second portion may be coplanar. For example, the first portion 820 may be coplanar relative to the second portion 830 along a central axis of the picking assembly.

In FIG. 8C, the spring 860 is depicted in detail. The spring 860 may be coupled to one of the first portion 820 or the second portion 830, and another spring may be optionally coupled to the other portion. A first top view 870 depicts the integrated brake assembly 800 in an engaged position. A second top view 872 depicts the integrated brake assembly 800 in a disengaged position. A third top view 874 depicts the integrated brake assembly 800 during a movement from a disengaged position to an engaged position.

Embodiments may therefore include a picking assembly having a first piston subassembly with a first shell and a first suction cup, the first piston subassembly configured to independently actuate from a retracted position to an extended position, and a second piston subassembly having a second shell and a second suction cup, the second piston subassembly configured to independently actuate from the retracted position to the extended position. The picking assembly may include a brake assembly configured to engage the first shell and the second shell, where the brake assembly prevents axial movement of the first piston subassembly and the second piston assembly when the brake assembly is engaged.

The brake assembly may include the first portion 820 having a first recessed portion or a first concave surface, and the second portion 830 having a second recessed portion or second concave surface. The first shell may be secured between the first recessed portion and the second recessed portion when the brake assembly is engaged. The second portion 830 may be configured to slide relative to the first portion 820.

In some embodiments, the brake assembly may include the first portion 820 configured to engage an outer surface of a first piston subassembly, and the second portion 830 configured to engage the outer surface of the first piston subassembly, where the second portion 830 is configured to slide relative to the first portion 820. The brake assembly may include a first spring 860 configured to bias the first portion 820 away from the second portion 830, and a first actuator 810 configured to compress the first spring 860, such that the first portion 820 is actuated toward the second portion 830. The brake assembly 800 may be configured to prevent axial movement of the first piston subassembly.

The first portion 820 may be disposed on a first plane along a central axis of the picking assembly, and the second portion 830 may be disposed on a second plane along the central axis. The brake assembly 800 may include a first spring configured to bias the first portion away from the second portion, and a first actuator configured to compress the first spring responsive to positive air pressure. The brake assembly 800 may include a second spring configured to bias the second portion away from the first portion, and a second actuator configured to actuate the second portion toward the first portion. The brake assembly may include a second spring configured to bias the second portion away from the first portion, and a second actuator configured to compress the second spring responsive to positive air pressure.

In some embodiments, as illustrated in the example of FIG. 8B, the first actuator 810 may engage a first ramp formed on the first portion 820, and the second actuator 810 may engage a second ramp formed on the second portion 830. The first actuator and the second actuator may be actuated along the central axis of the picking assembly, and compression of the first spring and the second spring may cause movement of the respective first portion 820 and the second portion 830 along a lateral axis of the picking assembly.

Figure 9A:
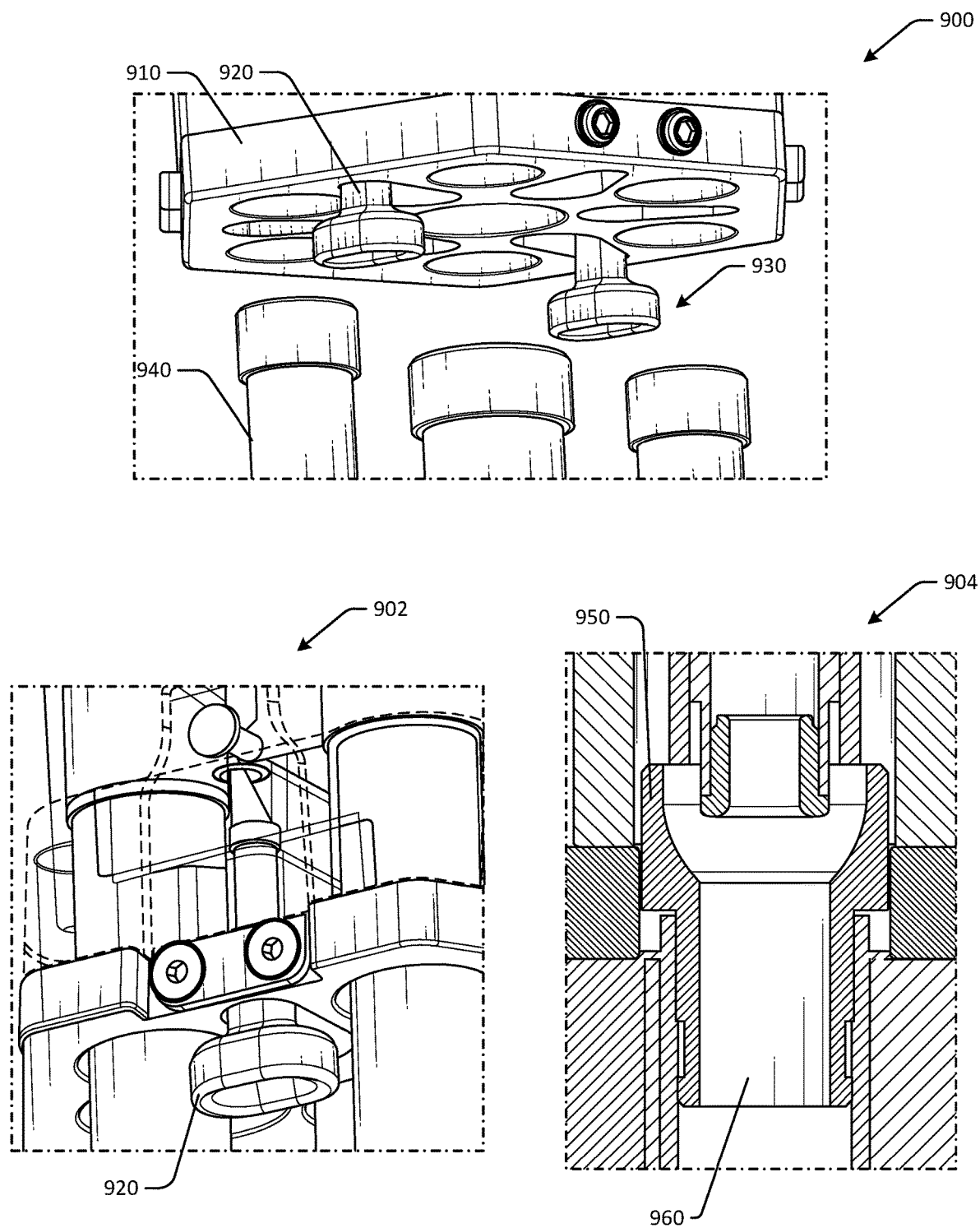
FIGS. 9A-9B are schematic illustrations of an example piston release mechanism in accordance with one or more embodiments of the disclosure.
Figure 9B:
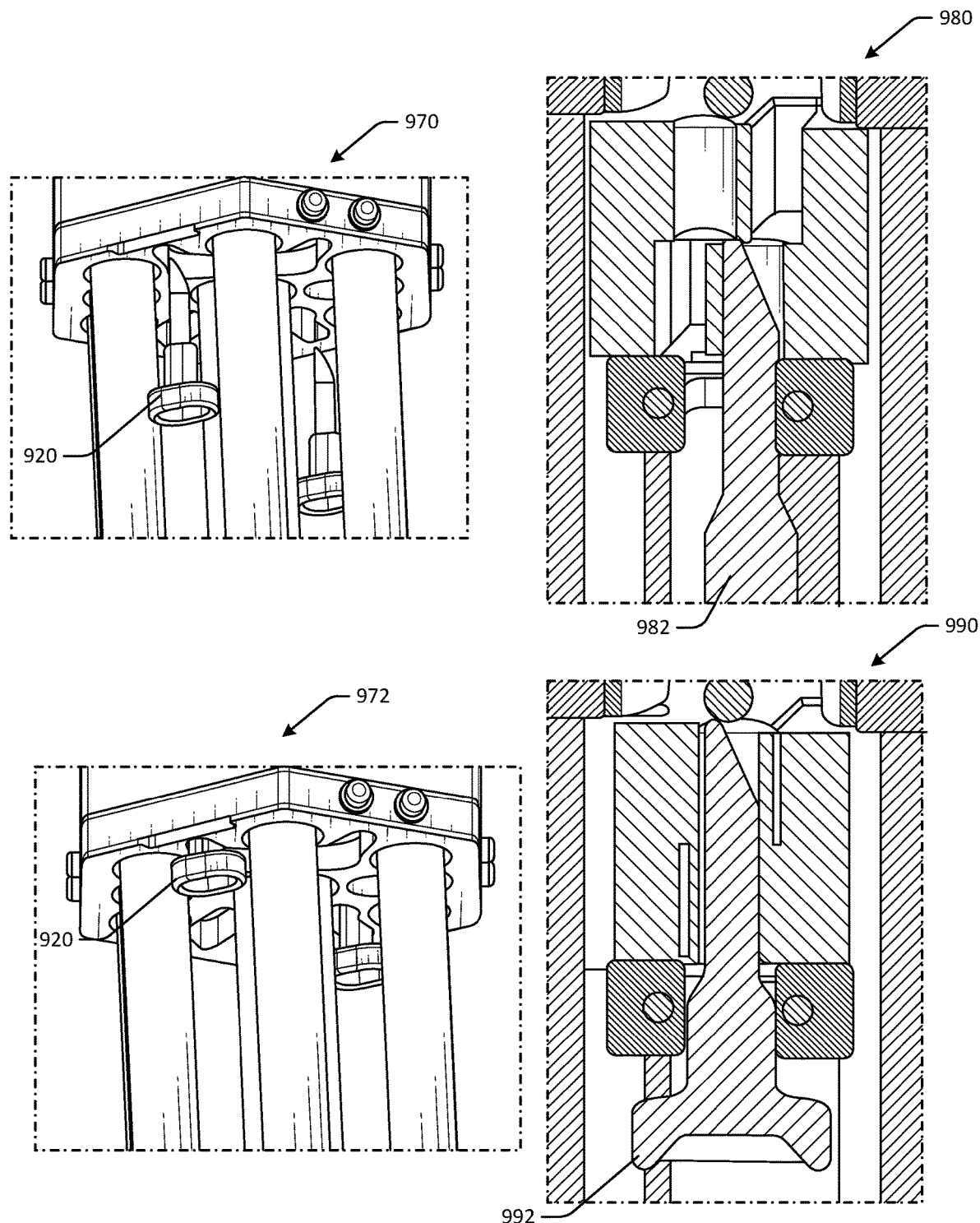

FIGS. 9A-9B are schematic illustrations of an example piston release mechanism in accordance with one or more embodiments of the disclosure. Other embodiments may include additional or fewer components. The illustrations of FIGS. 9A-9B are not to scale, and may not be illustrated to scale with respect to other figures. The components illustrated in FIGS. 9A-9B may be components of the picking assemblies discussed with respect to FIGS. 1-8C.

In FIG. 9A, a picking assembly 900 is depicted in bottom perspective view. The picking assembly 900 may include a lower portion 910 and one or more piston subassemblies 940. The picking assembly 900 may include a first quick release pin 920 and a second quick release pin 930. As depicted in partially transparent view 902, actuation of the first quick release pin 920 toward the lower portion 910 may cause release of one or more piston subassemblies due to engagement between the first quick release pin 920 and an internal release mechanism of the picking assembly 900. In cross-sectional view 904, a bushing 950 may be released with the piston subassembly when the first quick release pin 920 or the second quick release pin 930 are actuated. In one example, the first quick release pin 920 may be configured to release the first piston subassembly from the picking assembly when actuated.

In FIG. 9B, the first quick release pin 920 is depicted in an unactuated position 970 and an actuated positon 972, with corresponding interval views 980 and 990. In the unactuated internal view 980, the piston subassemblies remain secured as an end 982 of the first quick release pin 920 is disengaged, whereas in the actuated internal view 990, the piston subassemblies are free to slide out of the picking assembly as the end of the first quick release pin 920 is in an engaged position 992. Repair and maintenance of the picking assembly may therefore be expedited.

One or more operations of the methods, process flows, or use cases of FIGS. 1-9B may have been described above as being performed by a user device, or more specifically, by one or more program module(s), applications, or the like executing on a device. It should be appreciated, however, that any of the operations of the methods, process flows, or use cases of FIGS. 1-9B may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-9B may be described in the context of the illustrative devices, it should be appreciated that such operations may be implemented in connection with numerous other device configurations.

The operations described and depicted in the illustrative methods, process flows, and use cases of FIGS. 1-9B may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-9B may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 10:
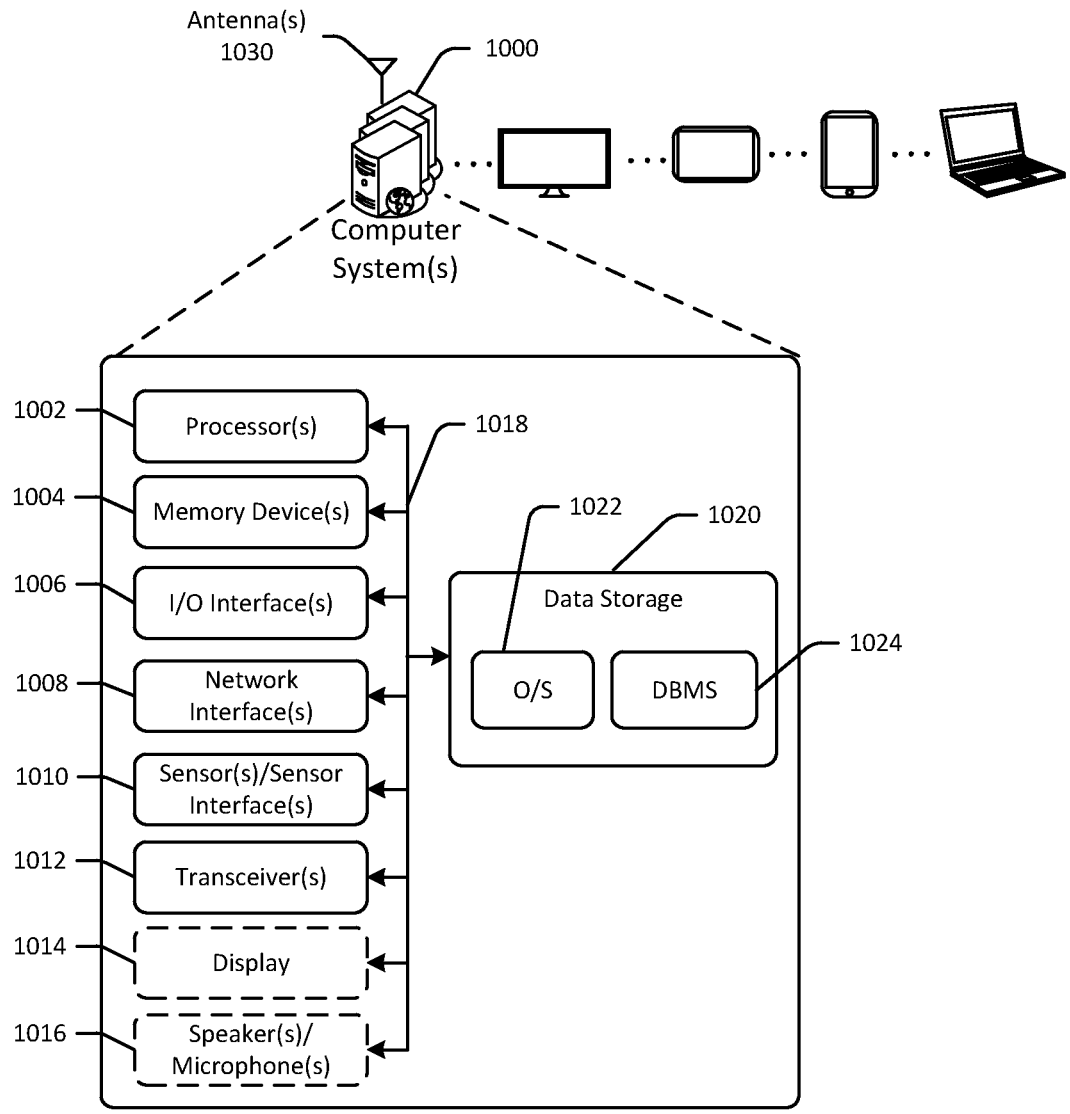
FIG. 10 schematically illustrates an example architecture of a computer system associated with an item picking system in accordance with one or more embodiments of the disclosure.

FIG. 10 is a schematic block diagram of one or more illustrative computer system(s) 1000 associated with an item handling system in accordance with one or more example embodiments of the disclosure. The computer system(s) 1000 may include any suitable computing device including, but not limited to, a server system, a voice interaction device, a mobile device such as a smartphone, a tablet, an e-reader, a wearable device, or the like; a desktop computer;

a laptop computer; a content streaming device; or the like. The computer system(s) 1000 may correspond to an illustrative device configuration for the controller(s) or computer system(s) of FIGS. 1-9B. For example, the computer system(s) 1000 may be a controller and may control one or more aspects of the robotic manipulators and/or picking assemblies described in FIGS. 1-9B.

The computer system(s) 1000 may be configured to communicate with one or more servers, user devices, or the like. The computer system(s) 1000 may be configured to perform item detection, determine picking assembly configuration, determine vacuum pressure, cause vacuum pressure to be applied, cause a brake to be applied, and so forth.

The computer system(s) 1000 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 1000 may include one or more processors (processor(s)) 1002, one or more memory devices 1004 (also referred to herein as memory 1004), one or more input/output (I/O) interface(s) 1006, one or more network interface(s) 1008, one or more sensor(s) or sensor interface(s) 1010, one or more transceiver(s) 1012, one or more optional display(s) 1014, one or more optional microphone(s) 1016, and data storage 1020. The computer system(s) 1000 may further include one or more bus(es) 1018 that functionally couple various components of the computer system(s) 1000. The computer system(s) 1000 may further include one or more antenna(s) 1030 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 1018 may include at least one of a system bus, a memory bus, an address bus, or a message bus, and may permit the exchange of information (e.g., data (including computer-executable code), signaling, etc.) between various components of the computer system(s) 1000. The bus(es) 1018 may include, without limitation, a memory bus or a memory controller, a peripheral bus, an accelerated graphics port, and so forth. The bus(es) 1018 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 1004 of the computer system(s) 1000 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1004 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1004 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1020 may include removable storage and/or non-removable storage including, but not limited to, magnetic storage, optical disk storage, and/or tape storage. The data storage 1020 may provide non-volatile storage of computer-executable instructions and other data. The memory 1004 and the data storage 1020, removable and/or non-removable, are examples of computer-readable storage media (CRSM) as that term is used herein.

The data storage 1020 may store computer-executable code, instructions, or the like that may be loadable into the memory 1004 and executable by the processor(s) 1002 to cause the processor(s) 1002 to perform or initiate various operations. The data storage 1020 may additionally store data that may be copied to the memory 1004 for use by the processor(s) 1002 during the execution of the computer-executable instructions. Moreover, output data generated as a result of execution of the computer-executable instructions by the processor(s) 1002 may be stored initially in the memory 1004, and may ultimately be copied to the data storage 1020 for non-volatile storage.

More specifically, the data storage 1020 may store one or more operating systems (O/S) 1022; one or more database management systems (DBMS) 1024; and one or more program module(s), applications, engines, computer-executable code, scripts, or the like. Some or all of these module(s) may be sub-module(s). Any of the components depicted as being stored in the data storage 1020 may include any combination of software, firmware, and/or hardware. The software and/or firmware may include computer-executable code, instructions, or the like that may be loaded into the memory 1004 for execution by one or more of the processor(s) 1002. Any of the components depicted as being stored in the data storage 1020 may support functionality described in reference to corresponding components named earlier in this disclosure.

The data storage 1020 may further store various types of data utilized by the components of the computer system(s) 1000. Any data stored in the data storage 1020 may be loaded into the memory 1004 for use by the processor(s) 1002 in executing computer-executable code. In addition, any data depicted as being stored in the data storage 1020 may potentially be stored in one or more datastore(s) and may be accessed via the DBMS 1024 and loaded in the memory 1004 for use by the processor(s) 1002 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 1002 may be configured to access the memory 1004 and execute the computer-executable instructions loaded therein. For example, the processor(s) 1002 may be configured to execute the computer-executable instructions of the various program module(s), applications, engines, or the like of the computer system(s) 1000 to cause or facilitate various operations to be performed in accordance with one or more embodiments of the disclosure. The processor(s) 1002 may include any suitable processing unit capable of accepting data as input, processing the input data in accordance with stored computer-executable instructions, and generating output data. The processor(s) 1002 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1002 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1002 may be capable of supporting any of a variety of instruction sets.

Referring now to other illustrative components depicted as being stored in the data storage 1020, the O/S 1022 may be loaded from the data storage 1020 into the memory 1004 and may provide an interface between other application software executing on the computer system(s) 1000 and the hardware resources of the computer system(s) 1000. More specifically, the O/S 1022 may include a set of computer-executable instructions for managing the hardware resources of the computer system(s) 1000 and for providing common services to other application programs (e.g., managing memory allocation among various application programs). In certain example embodiments, the O/S 1022 may control execution of the other program module(s). The O/S 1022 may include any operating system now known or which may be developed in the future including, but not limited to, any server operating system, any mainframe operating system, or any other proprietary or non-proprietary operating system.

The DBMS 1024 may be loaded into the memory 1004 and may support functionality for accessing, retrieving, storing, and/or manipulating data stored in the memory 1004 and/or data stored in the data storage 1020. The DBMS 1024 may use any of a variety of database models (e.g., relational model, object model, etc.) and may support any of a variety of query languages. The DBMS 1024 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 1000 is a mobile device, the DBMS 1024 may be any suitable lightweight DBMS optimized for performance on a mobile device.

Referring now to other illustrative components of the computer system(s) 1000, the input/output (I/O) interface(s) 1006 may facilitate the receipt of input information by the computer system(s) 1000 from one or more I/O devices as well as the output of information from the computer system(s) 1000 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 1000 or may be separate. The I/O devices may further include, for example, any number of peripheral devices such as data storage devices, printing devices, and so forth.

The I/O interface(s) 1006 may also include an interface for an external peripheral device connection such as universal serial bus (USB), FireWire, Thunderbolt, Ethernet port or other connection protocol that may connect to one or more networks. The I/O interface(s) 1006 may also include a connection to one or more of the antenna(s) 1030 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 1000 may further include one or more network interface(s) 1008 via which the computer system(s) 1000 may communicate with any of a variety of other systems, platforms, networks, devices, and so forth. The network interface(s) 1008 may enable communication, for example, with one or more wireless routers, one or more host servers, one or more web servers, and the like via one or more networks.

The antenna(s) 1030 may include any suitable type of antenna depending, for example, on the communications protocols used to transmit or receive signals via the antenna(s) 1030. Non-limiting examples of suitable antenna(s) may include directional antenna(s), non-directional antenna(s), dipole antenna(s), folded dipole antenna(s), patch antenna(s), multiple-input multiple-output (MIMO) antenna(s), or the like. The antenna(s) 1030 may be communicatively coupled to one or more transceivers 1012 or radio components to which or from which signals may be transmitted or received.

As previously described, the antenna(s) 1030 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 1030 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11 g, 802.11n), 5 GHz channels (e.g., 802.11n, 802.11ac), or 60 GHz channels (e.g., 802.11ad). In alternative example embodiments, the antenna(s) 1030 may be configured to transmit or receive radio frequency signals within any suitable frequency range forming part of the unlicensed portion of the radio spectrum.

The antenna(s) 1030 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1012 may include any suitable radio component(s) for—in cooperation with the antenna(s) 1030—transmitting or receiving radio frequency (RF) signals in the bandwidth and/or channels corresponding to the communications protocols utilized by the computer system(s) 1000 to communicate with other devices. The transceiver(s) 1012 may include hardware, software, and/or firmware for modulating, transmitting, or receiving—potentially in cooperation with any of antenna(s) 1030—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1012 may further include hardware, firmware, or software for receiving GNSS signals. The transceiver(s) 1012 may include any known receiver and baseband suitable for communicating via the communications protocols utilized by the computer system(s) 1000. The transceiver(s) 1012 may further include a low noise amplifier (LNA), additional signal amplifiers, an analog-to-digital (A/D) converter, one or more buffers, a digital baseband, or the like.

The sensor(s)/sensor interface(s) 1010 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 1014 may be configured to output light and/or render content. The optional speaker(s)/microphone(s) 1016 may be any device configured to receive analog sound input or voice data.

It should be appreciated that the program module(s), applications, computer-executable instructions, code, or the like depicted in FIG. 10 as being stored in the data storage 1020 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 1000, and/or hosted on other computing device(s) accessible via one or more networks, may be provided to support functionality provided by the program module(s), applications, or computer-executable code depicted in FIG. 10 and/or additional or alternate functionality. Further, functionality may be modularized differently such that processing described as being supported collectively by the collection of program module(s) depicted in FIG. 10 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 10 may be implemented, at least partially, in hardware and/or firmware across any number of devices.

It should further be appreciated that the computer system(s) 1000 may include alternate and/or additional hardware, software, or firmware components beyond those described or depicted without departing from the scope of the disclosure. More particularly, it should be appreciated that software, firmware, or hardware components depicted as forming part of the computer system(s) 1000 are merely illustrative and that some components may not be present or additional components may be provided in various embodiments. While various illustrative program module(s) have been depicted and described as software module(s) stored in the data storage 1020, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed:

1. A robotic picking assembly comprising:
   a robotic manipulator;
   an airflow system configured to provide positive air pressure and negative air pressure;
   a picking assembly coupled to the robotic manipulator and the airflow system, the picking assembly configured to pick up and release objects, the picking assembly comprising:
      a vacuum manifold comprising a first integrated air pressure path and a second integrated air pressure path;
      a first piston subassembly comprising a first air pipe, a first vacuum pipe, a first bushing disposed between the first air pipe and the first vacuum pipe, and a first suction cup, wherein the first piston subassembly is configured to independently actuate from a retracted position to an extended position; and
      a second piston subassembly comprising a second air pipe, a second vacuum pipe, a second bushing disposed between the second air pipe and the second vacuum pipe, and a second suction cup, wherein the second piston subassembly is configured to independently actuate from the retracted position to the extended position;
      wherein the first integrated air pressure path directs both positive and negative airflow to the first air pipe, and the second integrated air pressure path directs both positive and negative airflow to the second air pipe; and
      wherein the first vacuum pipe is disposed in the first air pipe, such that a chamber is formed between an outer surface of the first vacuum pipe and an inner surface of the first air pipe, and wherein the positive and negative airflow from the first integrated air pressure path flows into the chamber.

2. The robotic picking assembly of claim 1, wherein the first bushing slides relative to the first vacuum pipe, and wherein the positive airflow from the first integrated air pressure path causes the first bushing to slide towards a distal end of the first piston subassembly.

3. The robotic picking assembly of claim 1, wherein the vacuum manifold further comprises a third integrated air pressure path, the picking assembly further comprising:
a brake assembly comprising:
a first portion configured to engage an outer surface of the first piston subassembly;
a second portion configured to engage the outer surface of the first piston subassembly, wherein the second portion is configured to slide relative to the first portion;
a first spring configured to bias the first portion away from the second portion; and
a first actuator configured to compress the first spring, such that the first portion is actuated toward the second portion;
wherein the brake assembly is configured to prevent axial movement of the first piston subassembly.

4. A picking assembly comprising:
a vacuum manifold comprising a first integrated air pressure path and a second integrated air pressure path;
a first piston subassembly comprising a first air pipe, a first vacuum pipe, a first bushing disposed between the first air pipe and the first vacuum pipe, and a first suction cup, wherein the first piston subassembly is configured to independently actuate from a retracted position to an extended position; and
a second piston subassembly comprising a second air pipe, a second vacuum pipe, a second bushing disposed between the second air pipe and the second vacuum pipe, and a second suction cup, wherein the second piston subassembly is configured to independently actuate from the retracted position to the extended position;
wherein the first integrated air pressure path directs airflow to the first air pipe, and the second integrated air pressure path directs airflow to the second air pipe; and
wherein the first piston subassembly is a central piston subassembly of the picking assembly, and the first piston subassembly has a first airflow rate that is greater than a second airflow rate of the second piston subassembly.

5. The picking assembly of claim 4, wherein the first vacuum pipe is disposed in the first air pipe, such that a chamber is formed between an outer surface of the first vacuum pipe and an inner surface of the first air pipe; and
wherein the first vacuum pipe provides suction at the first suction cup.

6. The picking assembly of claim 5, wherein the airflow from the first integrated air pressure path flows into the chamber.

7. The picking assembly of claim 4, wherein the first bushing slides relative to the first vacuum pipe.

8. The picking assembly of claim 7, wherein positive airflow from the first integrated air pressure path causes the first bushing to slide towards a distal end of the first piston subassembly; and
wherein negative airflow from the first integrated air pressure path causes the first bushing to slide towards a proximal end of the first piston subassembly.

9. The picking assembly of claim 4, wherein the first piston subassembly is configured to actuate to the extended position responsive to positive air pressure in the first air pipe, and to actuate to the retracted position responsive to negative air pressure in the first air pipe; and
wherein the second piston subassembly is configured to actuate to the extended position responsive to positive air pressure in the second air pipe, and to actuate to the retracted position responsive to negative air pressure in the second air pipe.

10. The picking assembly of claim 4, wherein the second piston subassembly further comprises:
a valve disposed in the second vacuum pipe;
wherein the valve prevents airflow through the second vacuum pipe when the second piston subassembly is in the retracted position.

11. The picking assembly of claim 4, wherein the vacuum manifold further comprises a third integrated air pressure path, the picking assembly further comprising:
a brake assembly comprising:
a first portion configured to engage an outer surface of the first piston subassembly;
a second portion configured to engage the outer surface of the first piston subassembly, wherein the second portion is configured to slide relative to the first portion;
a first spring configured to bias the first portion away from the second portion; and
a first actuator configured to compress the first spring, such that the first portion is actuated toward the second portion;
wherein the brake assembly is configured to prevent axial movement of the first piston subassembly.

12. The picking assembly of claim 4, further comprising:
a first quick release pin configured to release the first piston subassembly from the picking assembly when actuated.

13. The picking assembly of claim 4, further comprising:
a lightweight shell; and
one or more machine-readable markers disposed on the lightweight shell.

14. The picking assembly of claim 4, wherein the picking assembly is extendable in length by about 50%, and wherein the picking assembly has a weight-to-extended length ratio of between about 0.035 lb/inch and about 0.045 lb/inch.

15. A robotic picking system comprising:
a robotic manipulator; and
a picking assembly coupled to the robotic manipulator, the picking assembly comprising:
a vacuum manifold comprising a first integrated air pressure path and a second integrated air pressure path;
a first piston subassembly comprising a first air pipe, a first vacuum pipe, a first bushing disposed between the first air pipe and the first vacuum pipe, and a first suction cup, wherein the first piston subassembly is configured to independently actuate from a retracted position to an extended position; and
a second piston subassembly comprising a second air pipe, a second vacuum pipe, a second bushing disposed between the second air pipe and the second vacuum pipe, a second suction cup, and a valve disposed in the second vacuum pipe, wherein the second piston subassembly is configured to independently actuate from the retracted position to the extended position, and wherein the valve prevents airflow through the second vacuum pipe when the second piston subassembly is in the retracted position;

wherein the first integrated air pressure path directs positive and negative airflow to the first air pipe, and the second integrated air pressure path directs positive and negative airflow to the second air pipe.

16. The robotic picking system of claim 15, wherein the first vacuum pipe is disposed in the first air pipe, such that a chamber is formed between an outer surface of the first vacuum pipe and an inner surface of the first air pipe.

17. The robotic picking system of claim 5, wherein slides relative to the first vacuum pipe, and wherein the positive airflow from the first integrated air pressure path causes the first bushing to slide towards a distal end of the first piston subassembly, and the negative airflow from the first integrated air pressure path causes the first bushing to slide towards a proximal end of the first piston subassembly.

* * * * *